US006482288B1

(12) United States Patent
Kreckel et al.

(10) Patent No.: US 6,482,288 B1
(45) Date of Patent: Nov. 19, 2002

(54) IMAGE GRAPHIC ADHESIVE SYSTEM AND METHOD FOR USING SAME

(75) Inventors: Karl Werner Kreckel, Haan (DE); Wilhelm Kuester, Korschenbroich (DE); Bruno Mueller, Duesseldorf (DE); Pierre Congard, Beauchamp (FR); Francis V. Loncar, Jr., Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/528,256

(22) Filed: Mar. 17, 2000

Related U.S. Application Data

(60) Provisional application No. 60/331,369, filed on Mar. 17, 2000, provisional application No. 60/172,260, filed on Mar. 19, 1999, provisional application No. 60/198,233, filed on Mar. 19, 1999, provisional application No. 60/198,247, filed on Mar. 19, 1999, and provisional application No. 60/228,799, filed on Mar. 19, 1999.

(51) Int. Cl.$^{7}$ ........................ B32B 31/00
(52) U.S. Cl. ........................ 156/247; 156/277
(58) Field of Search ........................ 156/247, 249, 156/277; 40/594; 428/343, 354, 355 RA, 355 BL

(56) References Cited

U.S. PATENT DOCUMENTS

| | | | | |
|---|---|---|---|---|
| 1,676,835 | A | * | 7/1928 | Oberheu |
| 2,030,135 | A | * | 2/1936 | Carpenter |
| 2,046,924 | A | * | 7/1936 | Pendergast |

(List continued on next page.)

FOREIGN PATENT DOCUMENTS

| | | |
|---|---|---|
| EP | 0 570 515 B1 | 11/1993 |
| EP | 0 632 423 A3 | 1/1995 |
| EP | 0 681 927 | 11/1995 |
| EP | 0 736 585 A1 | 10/1996 |
| GB | 2 324 258 A | 4/1998 |
| JP | 5-193041 | 8/1993 |
| WO | WO 94/21742 | 9/1994 |
| WO | WO 95/06692 | 3/1995 |
| WO | WO 96/07079 | 3/1996 |
| WO | WO 97/07492 | 2/1997 |
| WO | WO 98/00470 | 1/1998 |
| WO | WO 98/29516 | 7/1998 |
| WO | WO 98/39759 | 9/1998 |

*Primary Examiner*—Curtis Mayes
(74) *Attorney, Agent, or Firm*—James D. Christoff

(57) ABSTRACT

An adhesively mountable image using a reusable adhesive surface is provided. The image carrier is removable from the adhesive carrier, and a subsequent image carrier may be releasably bound to the same adhesive carrier. Kits for this system are also provided.

16 Claims, 1 Drawing Sheet

U.S. PATENT DOCUMENTS

| | | | | | |
|---|---|---|---|---|---|
| 2,914,873 | A | * | 12/1959 | Brennan | |
| 3,516,423 | A | | 6/1970 | Seidler | 132/88.7 |
| 3,645,281 | A | | 2/1972 | Seidler | 132/88.7 |
| 3,682,690 | A | | 8/1972 | Amos et al. | 117/122 P |
| 3,754,991 | A | | 8/1973 | Amos et al. | 134/4 |
| 3,952,133 | A | | 4/1976 | Amos et al. | 428/354 |
| 4,197,151 | A | * | 4/1980 | Muzik | |
| 4,225,663 | A | | 9/1980 | Ball | 430/303 |
| 4,695,077 | A | * | 9/1987 | Pretre | |
| 4,742,631 | A | * | 5/1988 | Zimble | |
| 4,900,604 | A | | 2/1990 | Martinez et al. | 428/79 |
| 4,950,517 | A | * | 8/1990 | Loggins | |
| 4,999,937 | A | | 3/1991 | Bechtold | 40/610 |
| 5,015,556 | A | | 5/1991 | Martens | 430/306 |
| 5,045,391 | A | | 9/1991 | Brandt et al. | 428/336 |
| 5,071,728 | A | | 12/1991 | Watts | 430/126 |
| 5,106,710 | A | | 4/1992 | Wang et al. | 430/42 |
| 5,114,520 | A | | 5/1992 | Wang, Jr. et al. | 156/240 |
| 5,141,790 | A | | 8/1992 | Calhoun et al. | 428/40 |
| 5,196,266 | A | | 3/1993 | Lu et al. | 428/355 |
| 5,248,536 | A | * | 9/1993 | Du Katz | |
| 5,262,259 | A | | 11/1993 | Chou et al. | 430/47 |
| 5,296,277 | A | | 3/1994 | Wilson et al. | 428/40 |
| 5,316,849 | A | | 5/1994 | Lu et al. | 428/355 |
| 5,322,761 | A | | 6/1994 | Kausch et al. | 430/273 |
| 5,326,619 | A | | 7/1994 | Dower et al. | 428/164 |
| 5,362,516 | A | | 11/1994 | Wilson et al. | 427/207.1 |
| 5,428,914 | A | * | 7/1995 | Whitehouse et al. | |
| 5,462,782 | A | | 10/1995 | Su | 428/40 |
| 5,505,801 | A | * | 4/1996 | Harris | |
| 5,543,190 | A | * | 8/1996 | Johnson et al. | |
| 5,598,655 | A | | 2/1997 | McGarrah | 40/611 |
| 5,670,294 | A | | 9/1997 | Piro | 430/169 |
| 5,676,787 | A | | 10/1997 | Rusincovitch et al. | 156/277 |
| 5,681,631 | A | | 10/1997 | Steelman et al. | 428/42 |
| 5,681,660 | A | | 10/1997 | Bull et al. | 428/500 |
| 5,721,086 | A | | 2/1998 | Emslander et al. | 430/126 |
| 5,725,923 | A | * | 3/1998 | Luhmann | |
| 5,747,217 | A | | 5/1998 | Zaklila et al. | 430/158 |
| 5,843,617 | A | | 12/1998 | Patel et al. | 430/201 |
| 5,866,220 | A | | 2/1999 | Rusincovitch | 428/40.01 |

* cited by examiner

IMAGE GRAPHIC ADHESIVE SYSTEM AND METHOD FOR USING SAME

This is a continuation-in-part of Application No. 60/331,369, filed Mar. 17, 2000, and Nos. 60/172,260, 60/198,233, 60/198,247 and 60/228,799, all filed on Mar. 19, 1999.

FIELD OF INVENTION

This invention relates to combined adhesive/substrate systems for placement and removal of image graphics.

BACKGROUND OF INVENTION

Image graphics are omnipresent in modem life. Images and data that warn, educate, entertain, advertise, etc. are applied on a variety of interior and exterior, vertical and horizontal surfaces. Nonlimiting examples of image graphics range from posters that advertise the arrival of a new movie to warning signs near the edges of stairways.

Readily replaceable image graphics are needed for those occasions when the length of time the graphic needs to remain at the intended location is limited to a short duration, often with a replacement image graphic substituting for the image graphic to be removed. An example of an expected replacement image graphic is the movie poster identified above.

Readily replaceable image graphics require both the "staying power" when placed on the horizontal or vertical surface and the "leaving ease" when the image graphic is to be removed.

Among different kinds of readily replaceable image graphics are films that have an image on one major surface and a field of adhesive on the opposing major surface. Again, movie posters and other bills are often adhered to a surface. If the adhesive is pressure sensitive and capable of being readily removed without leaving adhesive residue, then the poster can be posted and has staying power but is removed with ease.

While there are numerous methods of mounting image graphic films to a substrate, two methods that represent the present state-of-the-art are: Pressure Sensitive Adhesive (PSA) coated image-bearing substrates and mechanically fastened graphics. PSA coated substrates typically consist of a PSA coated onto a polymer film such as plasticized polyvinyl chloride (PVC) or high quality paper stock, which are supplied on a siliconized release paper to protect the PSA.

Mechanically fastened graphics can take many forms, examples of which maybe printed paper stock that is simple stapled to a desired substrate, printed cardboard or rigid polymer sheeting such as Plexiglas™ which can be mounted in position using nail, staples, clips or other methods, or even a PSA coated graphic that can be mounted on a rigid carrier such as cardboard and similarly mounted. Such graphics can also be mounted using magnets or small pieces of hook and loop fastener as described in U.S. Pat. No. 4,999,937 (Bechtold). Other mechanical fasteners are disclosed in U.S. Pat. Nos. 5,196,266 and 5,316,849 (both Lu et al.). Alternatively, the hook and loop construction can reside on an opposing major surface of a film that can also be printed on directly, as described in PCT International Patent Publication WO US98/39759 (Loncar).

Additionally, four types of systems bear special mention.

First, the manufacture of double-sided sheets frequently employ a release liner spirally wound with the sheet itself. To the extent that the liner has images or printed information, that liner is interacting with an adhesive but only for the duration of storage until use. Once the sheet is placed in use, the printed release liner is discarded. PCT Publication WO 97/07492 discloses a method of securing a picture on a movable picture carrier using a fastening means comprising a double-sided carrier with differing amounts of adhesion on each of the two sides. This publication uses double-sided sheets in key perimeter locations on picture to secure the picture to the carrier.

Second, 3M Post-It™ Memoboard #558 (Minnesota Mining and Manufacturing Company ("3M") of St. Paul, Minn., USA) provides a substrate having an exposed major surface of "repositionable" adhesive upon which individual pieces of paper or film as memos or notes can be adhered. The repositionability of notes on the major surface means that the adhesive is designed to have a low and limited amount of holding power.

Further, as the exposed major surface of adhesive becomes contaminated with dirt, oils etc., the adhesive can not be cleaned to restore its original holding power. In contrast, a pressure-sensitive display board is disclosed in U.S. Pat. No. 3,952,133 (Amos et al.), where a bulletin board, display panel, or other posting device has a pressure-sensitive adhesive surface on a thick resilient backing with the pressure sensitive adhesive being preferably a water-washable tacky elastomer. However, this display board is intended to permit adhesion of all types of materials including pens, keys, paper, small notebooks, and other disparate items (both light and heavy in mass). Thus, almost any item could conceivably adhere indiscriminately to the pressure-sensitive adhesive surface.

Third, cling vinyl graphics bear special mention. The substrate to which cling vinyl image graphics bond is limited in adhesion to extremely smooth surfaces such as glass, which makes a bond that has very low adhesive holding power. In addition, while not a PSA, the cling vinyl is generally supplied on a release liner in order to prevent blocking (material sticking to itself), and sticking to smooth surfaces such as metal printer equipment.

Fourth, U.S. Pat. No. 5,462,782 (Su et al.) discloses a target adhesive layer that can only be bonded to the same limited number of surfaces that are available to cling vinyl, where such surfaces have exposed adhesive having a tack that attracts dirt and can not be washed to restore the original adhesion of the adhesive. In another system, PCT Publication WO 95/06692 (Fuji) discloses a self adhesive film, that adheres to itself but not to other materials.

Image graphics using pressure sensitive adhesive surfaces, while extremely versatile, can encounter a number of limitations. First is that the inherent tackiness of the adhesive causes problems in applying the graphic smoothly and evenly to the surface. If the graphic is misaligned or wrinkled during application, the graphic must be removed and reapplied. In the worst case, the graphic can be damaged removing it, which means the graphic needs to be replaced with a new graphic, a considerable expense. Improvements such as contained in Controltac™ branded films sold by 3M have special adhesives to limit the initial adhesion, and thus allow limited repositionability. Repositionability of an adhesive is also described in U.S. Pat. No. 5,296,277 (Wilson et al.). Moreover, a multi-cycle refastenable contact responsive non-tacky fastener system is disclosed in PCT Publication WO 94/21742 (Kobe et al.).

While the use of special adhesive formulations definitely provides assistance in the initial placement of the graphics, these improved adhesives are not designed specifically for problems such as wrinkles that show up after the major portion of a graphic has been applied.

To assist in the removal of wrinkles, the adhesive can be further modified to limit tack, either chemically such as altering the glass transition temperature (Tg) of the adhesive composition, or physically, such as pattern coating or using microspheres. One approach taken using physical modification is disclosed in PCT Patent Publication WO 98/29516 (Sher et al.). However, this approach ends up causing a second limitation in image graphics using pressure sensitive adhesives: the adhesive must bond acceptably to numerous substrates for the intended application.

In most cases, commercially available pressure sensitive adhesives will bond acceptably to some substrates but have high adhesion to others. Moreover, when an adhesive is formulated to be removable, the situation worsens, because the adhesive can have three possible levels of adhesion: too high, too low or acceptable. Therefore, pressure sensitive adhesives are often formulated with a compromise in performance that all too often is not optimum for a particular application.

For the situation when graphics are applied to a variety of substrates, a variety of films with different pressure sensitive adhesive formulations may be needed to complete the job. This results in more logistical problems for the customer.

Another issue facing films that have an image on one major surface and a field of adhesive on the opposing major surface is the care during storage and placement so as not to contaminate the adhesive with dirt or other effects that diminish the intended adhesiveness. For that reason, a second film or paper is laminated to the adhesive surface and serves as a protective liner.

SUMMARY OF INVENTION

The present invention provides a method of displaying an image using a reusable adhesive surface. In this method, a flexible adhesive carrier is provided having first and second major surfaces, each surface being substantially covered by an adhesive. The first adhesive surface is engineered to bond the adhesive carrier to a substrate. The second adhesive surface is engineered to releasably secure an image carrier to the adhesive carrier. This adhesive carrier is bonded to a substrate at the first surface.

A flexible image carrier is also provided having first and second major surfaces, the first surface being imageable and the second surface being adapted to contact the releasably securing adhesive surface of the adhesive carrier. The image carrier is not adapted to adhere to the substrate. In the method of the present invention, the image carrier is imaged on the first surface, and removably adhered to the adhesive carrier by contacting the second surface of the image carrier with the second surface of the adhesive carrier. The image carrier resides on the adhesive carrier for a predetermined period of time. The image carrier and the adhesive carrier are substantially coextensive in size.

Additional methods provided herein include methods for displaying multiple images using a reusable adhesive surface, and such methods where the image is applied to a transparent substrate for viewing through the substrate. Additionally, kits of materials specially adapted for use with the described methods are provided.

DETAILED DESCRIPTION

Figure 1:
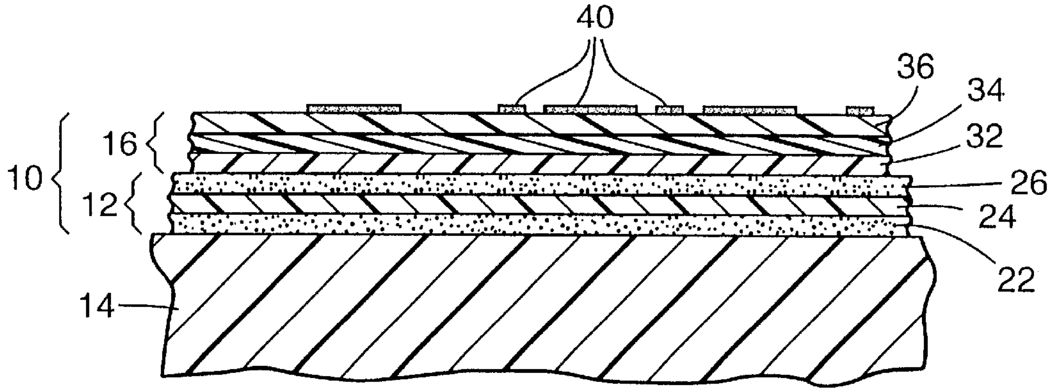
FIG. 1 is a cross-sectional view of an embodiment of the image graphic adhesive system of the present invention.

The present invention provides an adhesively mountable image graphic system wherein the adhesive is provided as a separate component from the image carrier. The separation of these components (as compared to prior art constructions that required the image carrier to itself be coated with an adhesive) surprisingly provides a more versatile; easier to manufacture, image and apply; and potentially much less expensive adhesively mountable image graphic system.

As noted above, the image carrier is flexible, and has a first major surface that is imageable and a second major surface that is adapted to contact the adhesive carrier, but will not adhere to the substrate. This is in contrast with the prior art adhesively mountable image graphic, which contains a layer of adhesive with a release liner covering the adhesive to prevent unwanted adhesion during the handling process. In the prior art system, any errors in imaging resulted in ruining a costly multilayer construction. The present imaging material is capable of being much lower in cost than the corresponding prior art construction, and results in much less material loss in case of error. Cost savings are particularly realized in the present system when multiple image carriers are used sequentially on the same adhesive carrier. Each image carrier that is displayed on an adhesive carrier after the first image carrier provides a savings of the adhesive material and corresponding release liner that would otherwise be present using prior art systems. A preferred system provides an adhesive carrier that is capable of being used with about 10–50 image carriers in a sequential manner. The more often an adhesive carrier is reused, the greater the savings provided by the present system. A particularly preferred system provides an adhesive carrier that may reside on the substrate for a period of 1–2 years, with a new image optionally applied every 1–2 weeks. Additionally, because no adhesive or liner layers need be present, the present image carrier material may be much easier to handle than the corresponding prior art construction.

In preferred embodiments, either or both the image carrier and the adhesive carrier may be reused—the image carrier at another location (or the same location at a later date), and the adhesive carrier with another image carrier. This ability to reuse one or both carriers provides a significant advantage to the system of the present invention.

Because both the image carriers and the adhesive carriers are flexible, the present system is easy to handle, transport and store. The adhesively mountable image graphic may optionally be applied to a substrate having a non-planar geometry, such as a curved surface.

In one embodiment, the present invention provides the ability to print images on image carriers that have not been coated with an adhesive. Such image carriers may be substantially thinner than adhesive-coated image carriers, because they do not have a release liner protecting the adhesive. This difference in structure may make it possible for a greater variety of printing methods to be used with adhesively mountable image graphic materials, including those previously unavailable due to an inability to print on a medium that was adhesive-backed. The prior art method of providing an adhesively attachable image graphic required the presence on an adhesive on the back of an image graphic. This in turn requires the use of a liner, which itself increased the cost of the image graphic. More importantly, the liner to be used on such an image graphic further had to have special, usually costly characteristics to permit the liner to go through printing equipment. Those special requirements are avoided by image graphic marking system of the present invention.

The present invention additionally provides a significant benefit in allowing the user to store and use an image carrier that is not adhesive-backed and not liner-backed. Because the image carrier is less expensive by virtue of not containing as many materials, the expenses of inventory and shipment are reduced. Additionally, the risk of damage of the image caused by contact of the image with an adhesive or its components, or of ineffectiveness of the adhesive due to retention beyond its effective shelf life is also reduced or eliminated.

Optionally, an image may be provided on both sides of the image carrier. Alternatively, an image also may be provided on the adhesive carrier before application of the adhesive that will contact the intended substrate. This construction allows provision of an image that remains on the substrate (viewable through a transparent substrate or through the image carrier if the image carrier is transparent or translucent) as long as the adhesive carrier is in place, with a changeable image on the opposite side of the construction.

A preferred embodiment of the present invention is a method of displaying multiple images at the same location in a serial manner using a reusable adhesive surface, comprising the steps of:

(a) providing a flexible adhesive carrier having first and second major surfaces, each surface being substantially covered by an adhesive, the first adhesive surface engineered to bond the adhesive carrier to a substrate and the second adhesive surface engineered to releasably secure an image carrier to the adhesive carrier;

(b) bonding the adhesive carrier to a substrate at the first surface;

(c) providing a first flexible image carrier having first and second major surfaces, the first surface being imageable and the second surface being adapted to contact the releasably securing adhesive surface of the adhesive carrier, wherein the first image carrier is not adapted to adhere to the substrate;

(d) imaging the first image carrier on the first surface;

(e) removably adhering the first image carrier to the adhesive carrier by contacting the second surface of the first image carrier with the second surface of the adhesive carrier, and allowing said first image carrier to reside on said adhesive carrier for a predetermined period of time;

(f) providing a second flexible image carrier having first and second major surfaces, the first surface being imageable and the second surface being adapted to contact the releasably securing adhesive surface of the adhesive carrier, wherein the second image carrier is not adapted to adhere to the substrate;

(g) imaging the second image carrier on the first surface;

(h) removing the first image carrier from the adhesive carrier; and (i) removably adhering the second image carrier to the adhesive carrier by contacting the second surface of the second image carrier with the second surface of the adhesive carrier, and allowing said second image carrier to reside on said adhesive carrier for a predetermined period of time;

wherein the image carriers and the adhesive carrier are substantially coextensive in size.

It should be noted that any of the steps in the methods described herein may be taken in any order, provided that preparation steps essential to another step be undertaken first. For example, steps (c) and (f) may be carried out at substantially the same time, since they are both image carrier manufacturing steps. Likewise, steps (d) and (g) may be carried out at substantially the same time, since they are both imaging steps and may logically be done at the same time even though the second image carrier would have to be stored for some time before use. Since the image carrier is flexible, it could optionally be stored in rolled-up fashion. Obviously, step (g) could not be done before step (f), since (f) is a preparation step required to provide a material used in step (g). It is particularly preferred to perform steps (c) and (d) before step (b), since it is desirable to have the first image carrier already on hand and ready to apply once the adhesive carrier is adhered to the substrate.

In a particularly preferred embodiment, the first image carrier is provided ready for imaging already mounted on a reusable adhesive. Subsequent image carriers may replace the first image carrier. This embodiment allows efficient delivery of the adhesive carrier to the substrate, while still providing the benefit of a reusable adhesive in place on a substrate. In this embodiment, a method of displaying an image using a reusable adhesive surface is provided, comprising the steps of:

(a) providing an adhesively mountable image graphic composite having a reusable adhesive surface, comprising:

(i) a flexible adhesive carrier having first and second major surfaces, each surface being substantially covered by an adhesive, the first adhesive surface engineered to bond the adhesive carrier to a substrate and the second adhesive surface engineered to releasably secure an image carrier to the adhesive carrier; and (ii) a flexible image carrier having first and second major surfaces, the first surface being imageable and the second surface being in releasable contact with the releasably securing adhesive surface of the adhesive carrier;

wherein the image carrier and the adhesive carrier are substantially coextensive in size;

(b) imaging the image carrier on the first surface of the image carrier; and (c) bonding the adhesive carrier to a substrate at the first surface of the adhesive carrier.

Alternatively, the image carrier may first be imaged, and then secured to the adhesive carrier. This pre-imaged composite may then be provided to the applicator for bonding to the intended substrate.

The adhesive carrier may be provided with a separate release liner covering both the first adhesive and the second adhesive surfaces. Alternatively, a single release liner could be used, with each carrier rolled on itself, thereby using both sides of the release liner with the single adhesive carrier. The liner may be treated differently on each side to provide appropriate release characteristics such that the first adhesive surface is exposed for application to the substrate before the second adhesive surface is exposed for securing the image carrier. In another alternative delivery system, the adhesive carrier may be provided to the applicator in a pad of carriers, having a single release liner located between two adhesive carriers.

In another embodiment of the present invention, a method is provided for displaying an image through a substrate (such as a window and the like) using a reusable adhesive surface. This method comprises the steps of:

(a) providing a transparent or translucent, flexible adhesive carrier having first and second major surfaces, each surface being substantially covered by an adhesive, the first adhesive surface engineered to bond the adhesive carrier to a substrate and the second adhesive surface engineered to releasably secure an image carrier to the adhesive carrier;

(b) bonding the adhesive carrier to a transparent or translucent substrate at the first surface;

(c) providing a flexible image carrier having first and second major surfaces, the first surface being imageable and further being adapted to contact the releasably securing adhesive surface of the adhesive carrier, wherein the image carrier is not adapted to adhere to the substrate;

(d) imaging the image carrier on the first surface such that the image does not transfer to the adhesive carrier upon removal from the adhesive carrier;

(e) removably adhering the image carrier to the adhesive carrier by contacting the first surface of the image carrier with the second surface of the adhesive carrier, and allowing said image carrier to reside on said adhesive carrier for a predetermined period of time;

wherein the image carrier and the adhesive carrier are substantially coextensive in size.

Similarly to the methods described above, this method may additionally be used with a plurality of image carriers in a serial manner.

The image is provided in a manner such that the image does not transfer to the adhesive carrier upon removal from the adhesive carrier. A non-transferring image may be provided by using high quality inks or imaging materials and/or using a protective overlaminate material.

Images may optionally be provided on both sides of the image carrier, to provide two-way image display from the same construction.

In a particularly preferred embodiment, the adhesive carrier is removable from the substrate without tearing of the adhesive carrier. This allows for easy removal of the adhesive carrier from the substrate, after which the substrate may be restored to its original condition or prepared with a new adhesive carrier for a new cycle of image displays.

In another particularly preferred embodiment, the image carrier may be removed and reapplied to the adhesive carrier without distortion or damage to the image. This embodiment provides specifically for reuse of the image carrier at another time or location.

In a particularly preferred embodiment, the adhesive on the second adhesive surface is washable. For purposes of the present invention, a "washable" adhesive is an adhesive that can be treated by an appropriate cleaning solution (such as water or soap and water) to remove adhesively detrimental materials, thereby at least partially refreshing the adhesion of a used surface. After a number of uses, the adhesive may become dirty or otherwise detackified. Washing of washable adhesives removes materials that detract from the adhesion performance of the surface, and refreshes the surface for additional uses for adhesion of image carriers to the substrate.

In a preferred embodiment of the present invention, the substrate is a front panel of a backlit light display. Thus, the present invention provides a system for displaying an image using a reusable adhesive under the demanding conditions of images that are illuminated from behind the image and through the adhesive. Examples of such displays include windows and other transparent or translucent substrates that have a light source behind them. More preferably, the display is a light box display, such as are popularly used for advertising purposes in malls and airport terminals. A preferred embodiment of the present invention provides the adhesive carrier and the image carrier as transparent materials. This embodiment is particularly suited in window-type displays, or in light box displays where a separate material will be used to diffuse light. Alternatively, the adhesive carrier and the image carrier may be individually selected to be transparent or translucent, such that they are suitable for use for attachment to the front panel of a backlit light display. If both are transparent, a separate light diffuser may be provided for use in the light box. If one or both are translucent, the adhesive carrier and/or the image carrier may themselves act as the light diffuser, eliminating the need to add an additional diffuser film or material.

Certain sizes of carriers are particularly preferred for use in the present invention. Thus, the image carrier and the adhesive carrier are preferably ⅛–3 meters wide by ⅛–3 meters long, more preferably ½–3 meters wide by ½–3 meters long and yet more preferably 1–3 meters wide by 1–3 meters long.

Of particular advantage is the ability to provide a readily changeable high quality image graphic. Thus, the image carrier is preferably imaged using a method selected from the group consisting of thermal transfer of colorant, inkjet printing, screen printing, offset printing, flexographic printing, laser printing, electrophotographic printing, electrostatic transfer printing, and combinations thereof. Preferred images are provided by high quality, four color, high resolution imaging techniques. Preferably, the image has a resolution of 200 dpi or greater, more preferably 300 dpi or greater, and most preferably 500 dpi or greater.

An embodiment of the present invention that is particularly preferred is the use in multiple face, multiple component, rotating billboard systems. The billboard is constructed using, for example, multiple panels that align to form a flat image surface. Each panel is actually one face on, for example, a three face elongated component. Upon rotation of the components of a three-face billboard, the second face of each component is aligned to form a second flat image. Likewise, another rotation of the components aliens the third face of the components to form a third flat image. A final rotation returns the first image to the view of the observer.

The adhesive carrier has adhesive coated over the entirety of both major surfaces, in order to assure maximum bonding to the substrate for one major surface and releasably securing of the other major surface for the image carrier. In the situation where the carrier is itself adhesive, no additional adhesive material need be coated on the surface. The surface, therefore, can be stated to be covered by an adhesive, since the entire surface of the adhesive carrier displays adhesive properties.

In one embodiment of the present invention, the adhesive surface on the adhesive carrier may be selected to be highly versatile with respect to its ability to adhere a variety of image carriers through repetitious installations without diminishment of the assured usage for the desired duration and environment.

In another embodiment of the present invention, the image carrier's adhesive-contacting surface and the image carrier-contacting surface of the adhesive carrier may be selected to be compatible in order to maximize assured usage for specific durations and in specific environments.

In yet another embodiment of the present invention, the adhesive carrier may be selected such that it discriminately adheres to only certain image carrier materials, and do not adhere to other image carrier materials.

Another advantage of the invention is the ease of single installation of the adhesive carrier on the substrate and the ease of multiple installations of the image carrier on the adhesive carrier and removal therefrom without residue of adhesive, if the appropriate image carrier has been used with the appropriate adhesive carrier. In other words, it is possible to engineer the image graphic adhesive system of the present invention to discriminate among various compositions of image carriers such that only certain image carriers adhere at all to the releasable securing adhesive surface of the adhesive carrier. Moreover, it is possible in such engineered interaction of the image carrier and the adhesive carrier, that incorrect image carriers will not adhere at all to the adhesive carrier in the one extreme or incorrect image carriers will adhere permanently to the adhesive carrier in the other extreme. At either extreme, attempts to use the adhesive carrier to adhere incorrect image carriers will cause an inappropriate usage to be recognized by the owner of the substrate. For example, media companies lease surface space for advertising or sales promotion that can use the image graphic adhesive system of the present invention to provide appropriate image carriers or none at all.

Further features and advantages of the invention will become evident in the following discussion of embodiments of the invention, in relation to the drawing.

Image Graphic Adhesive System

FIG. 1 shows elements of an image graphic system that is common to various embodiments of the present invention. Image graphic system 10, comprises an adhesive carrier 12 durably bonded to substrate 14 of indeterminate thickness, upon which adhesive carrier 12, a image carrier 16 is releasably adhered.

Adhesive carrier 12 releasably secures image carrier 16 to substrate 14. Adhesive carrier 12 can comprise an adhesive surface 22 that durably bonds adhesive carrier 12 to substrate 14; a transparent, translucent, or opaque adhesive intergrity layer 24 that provides durable integrity of adhesive carrier 12 on substrate 14; and an adhesive surface 26 that releasably secures image carrier 16 in a manner that image carrier 16 can be repositioned or removed. Alternatively, adhesive carrier 12 can comprise only two adhesive surfaces 22 and 26, omitting adhesive integrity layer 24 if one or both of the adhesives have sufficient integrity for the surface area of substrate 14 to be covered by image carrier 16. Alternatively, adhesive carrier 12 can comprise only one adhesive formulation with two surfaces 22 and 26, if the adhesive performance allows both durable bonding to the substrate 14 and repositionable adhesion of image carrier 16 thereto.

Image carrier 16 can comprise an adhesive-contacting surface 32 that removably adheres to adhesive surface 26; a transparent, translucent, or opaque integrity layer 34 that provides durable integrity of image carrier 16 on adhesive carrier 12; and an imageable surface 36 that permits printing of an image graphic (collectively shown as 40) thereon. Alternatively, image carrier 16 can comprise only adhesive contacting surface 32 and imageable surface 36, omitting a separate integrity layer 34 if one or both of the adhesive-contacting surface 32 or imageable surface 36 have sufficient integrity for the surface area of substrate 14 to be covered by image carrier 16. Alternatively, image carrier 16 can comprise only one integral formulation that provides both an acceptable adhesive-contacting surface 32 and an imageable surface 36, if such formulation is available to the satisfaction of those skilled in the art.

The embodiment shown in FIG. 1 differs from conventional image graphics films that have an adhesive surface opposing an image, because the adhesive surface 26 is a part of the adhesive carrier 12 rather than being borne on image carrier 16. Moreover, the image graphic adhesive system of the present invention interposes a new adhesive interface between adhesive surface 26 and adhesive-contacting surface 32 that can be specifically engineered for uses of specific duration and environment. The image graphic system 10 therefore is a combination of adhesive carrier 12 and image carrier 16 with the interface between adhesive surface 26 and adhesive-contacting surface 32 being vital to the performance of the system 10 for multiple placement and release. Moreover, the interface between adhesive surface 22 and substrate 14 is also significant to assure controlled but durably secure attachment of adhesive carrier 12 to substrate 14, such that when image carrier 16 is removed, adhesive carrier 12 remains bonded to substrate 14.

A key element of the difference between the adhesion to the substrate and the adhesion to the image graphic is that the adhesion to the substrate 14 be greater than the adhesion to the image carrier 16. The discussion of differential peel adhesion below applies to all preferred embodiments of the present invention that exhibit this differential peel adhesion, not only to the embodiment illustrated in the figure.

One method to engineer the interface of image carrier 16 and adhesive carrier 12 and the interface of adhesive carrier 12 and substrate 14 is to compare the 90° peel adhesion for each interface using a standard 90° peel adhesion taught by DIN EN 28510 (part 1=90°, part 2=180°), utilizing the peel speed, substrate, and dwell times indicated herein.

In cases where a siliconized image carrier was used, a 180° peel test was employed as described in the Examples below. This test was employed because the 90° peel on these systems was very low and almost unmeasurable. 180° peel—most common for siliconized surfaces—gives a higher more measurable number. It is preferred that the peel at any angle between 20° and 180° gives the right relationship of surface releases, because preferably a user of the image graphic system of the present invention may peel the image carrier 16 from adhesive carrier 12 at any of those angles between 20° and 180°.

One characteristic of the image graphic adhesive system of the present invention is that the peel adhesion for the interface between adhesive carrier 12 and image carrier 16 is less than the peel adhesion for the interface between adhesive carrier 12 and substrate 14 after a dwell time of about 24 hours. Preferably, the 20°–180° peel adhesion for the interface between adhesive carrier 12 and image carrier 16 ranges from about 0.1 percent, to about 90 percent, percent of the 20°–180° peel adhesion for the interface between adhesive carrier 12 and substrate 14 after a dwell time of about 24 hours. Toward the 0.1% end of the range identified above, one could have a high strength non-removable surface bond in combination with a siliconized image carrier. Toward the 90% end of the range identified above, one could have a releasable adhesive bond to substrate 14 in combination with a relatively strong adhesive bond between the image carrier 16 and adhesive carrier 12.

In other words, with a baseline of peel adhesion between adhesive carrier 12 and substrate 14 considered as durably secure, the fraction of that peel adhesion between adhesive carrier 12 and image carrier 16 permit releasable removal of image carrier 16 from adhesive carrier 12.

Preferably, the percentage ranges from about 1 to about 80 in order to provide ease of removal but sufficient adhesion during use when measured after a 24 hour dwell time.

Adhesion at interfaces changes over time. Therefore at about 14 days of dwell time, the percentage ranges from about 0.1 to about 90 in order to provide predictable performance at the respective interfaces, based on choices of adhesives and how such adhesives interact with the surfaces such adhesive contact over time.

The differential interfacial adhesions for both 24 hour dwell time and 14 day dwell time are expressed as percentages because the actual values of peel adhesion can vary according to the varieties of substrates, adhesive carriers, and image carriers. However, one skilled in the art can adapt the selection of materials for adhesive carriers and image carriers based upon the type of substrate and the amount of duration and environmental conditions that affect both the securement of adhesive carrier 12 to substrate 14 and the releasable adhesion of image carrier 16 to adhesive carrier 12.

Additionally, the selection of materials for adhesive carriers and image carriers to establish differential interfacial adhesions can be based on a choice of the bond peel adhesion or the securing peel adhesion. One skilled in the art, knowing the desired range of fractional peel adhesion, can begin with the peel adhesion of the releasable securing adhesive surface 26 of the adhesive carrier 12 or the peel adhesion of the securing surface 22, in order to engineer an image graphic adhesive system suitable for specific use. Thus, the "baseline" of 20°–180° peel adhesion can begin from either adhesive surface 22 or 26.

The adhesive-contacting surface 32 of image carrier 16 is the surface designed in system 10 to releasably adhere to adhesive surface 26. Depending on the qualities of the adhesive chosen for adhesive surface 26, the adhesive-contacting surface 32 can be a variety of materials, depending on desired usage parameters of duration and environment. For each variety of adhesive surface 26, specific adhesive-contacting surfaces 32 of image carrier 16 are preferred.

For example, one embodiment for adhesive surface 26 can be described as adhesive that is not tacky to contact with most materials but is capable of releasably securing to adhesive-contacting surface 32 of image carrier 16 at the image interface. In other words, adhesive surface 26 is discriminately adhesive and otherwise has little or no tack for adhesion of other materials that do not meet the qualifications of adhesive-contacting surface 32.

Preferably, other properties of adhesive surface 26 are reusability, high internal strength, low dirt pickup, and aging characteristics that allow reproducible securing at the image interface of adhesive-contacting surface 32 to adhesive surface 26 over a long period of time. If possible, good cleanability is also desired. The reproducible securing should create a good bond at the image interface between adhesive surfaces 26 and adhesive-contacting surface 32 while also allowing easy removal without damage to the adhesive surface 26. The combination of adhesive carrier 12 and image carrier 16 need to form a high quality image graphic produced by any manual or mechanical means.

An advantage of the present invention is that the system allows the adhesive and film to be separate components, and thus optimized for a specific application. For adhesive carrier 12, the pressure sensitive adhesive chosen for surface 22 can be designed for optimum adhesion to the substrate 14, while the adhesive chosen for adhesive surface 26 can be very tacky indiscriminately, very tacky discriminately, or of little or no tack, depending on the duration and environment of usage.

The system 10 could be seen to have one limitation, namely that the system 10 in certain embodiments requires two applications; first adhesive carrier 12 to the substrate 14, and second image carrier 16 to adhesive carrier 12. While having to do two applications is a disadvantage, this is mitigated by the following factors: first, each of the applications is easier. If the adhesive carrier 12 is misaligned during application, the material can be trimmed square and to the proper size. Wrinkles can be cut out and replaced. Second, the lower adhesion of the image carrier 16 to adhesive carrier 12 (relative to the adhesion of adhesive carrier 12 to substrate 14) allows for easy, bubble-free application of the graphic, and easy removal and reapplication. Consequently, this step is very fast. Third, the system can be effectively used for image graphics where the adhesive carrier 12 is applied once, and the image carrier(s) 16 is applied and removed numerous times as the graphic is changed. Thus, the two applications are only done for the first time a graphic is placed. After that only an image carrier 16 is applied. Fourth, since the removal of the graphic image is easy and controlled, the time for changing graphics is greatly reduced. Thus, the system's time advantage is realized as the number of changes in the graphic increases.

Another advantage of the system of the present invention over conventional image graphics where the imaged film is adhesive-backed is that system 10 has less waste and potentially lower cost for a changeable graphics system. In a conventional adhesive-coated graphic, a customer must buy three components for each application: a graphic film, a pressure sensitive adhesive and a high quality liner. The liner is thrown away during application, and the pressure sensitive adhesive is disposed of when removing the graphic. In system 10, adhesive carrier 12 is supplied with a liner that also must be thrown away during application. However, the liner for adhesive carrier 12 is much less costly because the adhesive carrier 12 does not go through the print process, where a high quality liner may be needed for dimensional stability. The dual layer construction of the adhesive carrier 12 can be seen as consuming slightly more materials than traditional PSA on a conventional graphic only when using the system as a one-time application system. The material savings for the total system 10 occur when changing graphics; only the image carrier 16, without adhesive and without liner, is disposed to be replaced by a new image carrier, without adhesive and without liner. The adhesive is recycled in place. Further, since a customer only needs to buy another image carrier 16 for subsequent graphics, money is saved, or can be used to purchase a better quality film or higher resolution image graphics.

In comparison to mechanically fastened graphics, the system 10 has an important and advantageous attribute: the system 10 preferably has the thin caliper and conformability of a conventional pressure sensitive adhesive film graphic. In contrast, mechanically fastened graphics have the disadvantage of being relatively thick, bulky, and difficult to handle. Graphics that use a frame or rigid substrate are limited to flat applications. Even micromechanical bonding systems such as hook and loop are still an order of magnitude thicker than a pressure sensitive adhesive graphic. Thus, mechanically fastened graphics can not achieve in most applications the desired "painted-on" look of an adhered graphic. System 10 preferably has the advantage of retaining the thin caliper that gives the "painted-on" look of the high quality pressure sensitive adhesive graphics. Preferably the total image graphic is less than 20 mils thick. More preferably, the total image graphic is less than 10 mils thick.

A second advantage of system 10 over graphics such as hook and loop systems or gross mechanical fasteners such as staples is that the system 10 can preferably be used in back-lit graphic applications. Mechanically fastened graphics as described above do not perform well in this application because they are fairly expensive, they are too thick and do not let light pass through, or the construction is of intermittent density (i.e.: hook and loop) so that the light transmission is uneven. Preferred embodiments of system 10 have the advantage in that both layers can give uniform light transmission.

Conventional Application

In one preferred embodiment of the present invention, the system is provided in a relatively low cost format utilizing conventional image carriers. Materials may be selected such that the system may be used in environmentally challenging conditions, or in more controlled, less demanding conditions.

Uses of the image graphic adhesive system 10 in conventional application, environmentally challenging environments require predictable durability of the securement of adhesive carrier 12 to substrate 14 and the predictable durability of releasably adhered image carrier 16 to adhesive carrier 12 until a time of removal or repositioning. The duration of use for the image carrier 16 in a conventional application, environmentally challenging use ranges from about 1 day to about one year and preferably from about 1 week to about three months. Environmentally challenging environments can be outdoor uses or indoor uses where strong chemicals are present in the air or ultraviolet light is present or temperature extremes are present or humidity extremes or extreme changes of relative humidity are present.

"Conventional application" means using an image carrier which relies on its inherent release characteristics, e.g., an untreated paper or film. Materials in this category are not as easily repositionable and require more removal force as compared to image carriers which have special coatings which promote repositionability and easy removal. Conventional application does not lend itself as well to achieving a wrinkle-free and bubble-free application, particularly with inexperienced applicators. However, conventional application is very much preferred for inexpensive but highly resolved image graphics where the use of paper or uncoated film is acceptable as the receiving media for the image graphic. Also, conventional application is suitable in those situations when the image carrier needs to be firmly bonded to the adhesive carrier with reliability.

Adhesive Carrier Construction

Nonlimiting examples of adhesives for use on surface 22 of adhesive carrier 12 to bond to substrate 14 include strong, tacky adhesives such as acrylic adhesives available from 3M and Ashland Chemical Company of Columbus, Ohio, USA (such as AroSet™ branded acrylics); and those constructions disclosed in U.S. Pat. No. 5,196,266 and PCT Patent Publication WO94/21742, the disclosures of which are incorporated by reference herein. Environmentally controlled conditions allow for a broad selection of adhesives, including rubber adhesives, provided that the required peel strength parameters are met for the overall system.

Uses of the image graphic adhesive system 10 in conventional application, environmentally controlled environments require predictable durability of the bond of adhesive carrier 12 to substrate 14 and the predictable durability of releasably adhered image carrier 16 to adhesive carrier 12 until a time of removal or repositioning. Typically such environments are indoors and do not require special properties for the interface between adhesive carrier 12 and image carrier 16 such as a release coating. The duration for the image carrier 16 ranges from about one day to about 24 weeks and preferably from about one weeks to about 6 weeks. Environmentally environments can be indoor uses where no strong chemicals are present in the air or low amounts of ultraviolet light are present or no temperature extremes and no rain are present.

Because of the variation in location of the field of pressure sensitive adhesive, not in its formulation, conventional pressure sensitive adhesives presently used for image graphics can be acceptable for adhesive surface 26 of adhesive carrier 12. Nonlimiting examples of such pressure sensitive adhesives can generally be found in Satas, Ed. *Handbook of Pressure Sensitive Adhesives* 2 Ed. (Von Reinhold Nostrand 1989). Of these adhesives, desirable adhesives include solvent-based acrylic and rubber adhesives, water-based acrylic adhesives, hot melt adhesives, microsphere-based adhesives, and silicone-based adhesives, regardless of their method of preparation.

Coating weights of such adhesives on adhesive carrier 12 can range from about 10 $\mu$m to about 300 $\mu$m and preferably about 20 $\mu$m to about 250 $\mu$m.

Percent solids of such adhesives in the formulations to be applied on layer range from about 5% to about 100% and preferably from about 20% to about 100%.

Of these multitude of pressure sensitive adhesives, a few are preferred. Among the preferred are acrylic adhesives having permanently low tack such as microsphere-based adhesives disclosed in U.S. Pat. No. 5,141,790 (Calhoun et al.); U.S. Pat. No. 5,296,277 (Wilson et al.); U.S. Pat. No. 5,362,516 (Wilson et al.); and EPO Patent Publication EP 0 570 515 B1 (Steelman et al.), the disclosures of which are incorporated by reference herein.

Typical substrates to which this embodiment of system 10 is applied include painted metal, polymeric foam board, melamine coated chipboard, polymethylmethacrylate, glass, and the like.

For longer duration, environmentally challenging conditions, it is preferable that exposed adhesive on adhesive surface 26 be washable or otherwise capable of being cleaned. Certain Ashland Aroset brand and 3M brand adhesives are particularly suitable for cleaning between uses.

Nonlimiting examples of adhesive integrity layer 24 include thermoplastic materials such as polyolefins and polyesters. Preferably, such polyesters include polyethylene terephthalates and such polyolefins include polypropylenes, especially biaxially oriented polypropylenes.

Nonlimiting examples of adhesives for use on adhesive surface 26 include acrylic adhesives (from the same list as for adhesive surface 22, but different than that used in surface 22 to provide differential adhesion) from 3M and Ashland Chemical Co. and a nontacky adhesive such as a terpolymer of acrylonitrile, butadiene, and isoprene, or similar copolymer of acrylonitrile and either butadiene or isoprene, commercially available under the brand Nipol adhesives from Zeon Chemical Co, Louisville, Ky., USA and those adhesives disclosed in EPO Patent Publication EP 0 736 585 (Kreckel et al.), which describes a removable pressure sensitive adhesive that leads to adhesives that can be used to make pressure sensitive adhesive sheets with differential adhesion, the stronger adhesive serving on adhesive carrier 12 as adhesive surface 22 and the weaker adhesive serving as adhesive surface 26. Moreover, these adhesives are "washable" in that their tackiness diminished by dirt or other deleterious surface contact can be restored after cleaning with common cleaning agents including without limitation rinsing with clean water. Thus, these latter adhesives are desired when "cleanability" is a desired feature.

Coating weights of such adhesives on adhesive carrier 12 can range from about 10 $gm/m^2$ to about 300 $gm/m^2$ and preferably about 20 $gm/m^2$ to about 150 $gm/m^2$.

Typical substrates to which this embodiment of system 10 is applied include painted metal, polymeric foam board, and the like.

Regardless of intended application environment, the percent solids of such adhesives in the formulations to be applied on layer range from about 5% to about 100% and preferably from about 20% to about 100%.

The surface area of adhesive surface 26 can be coated as desired for the amount of re-usable adhesive surface area. Percentage coverage per unit area can range from about 20 to about 100% and preferably from about 50 to about 100%.

The thickness of adhesive carrier 12 can range from about 12 μm to about 500 μm, and preferably from about 25 μm to about 300 μm. Depending on the number of components in adhesive carrier 12, that thickness can be composed of an adhesive for surface 22 that ranges from about 12 μm to about 200 μm and preferably from about 25 μm to about 125 μm; an adhesive integrity layer 24 that ranges from about 0.0 μm to about 100 μm and preferably from about 12 μm to about 75 μm; and an adhesive for adhesive surface 26 that ranges from about 12 μm to about 200 μm and preferably from about 25 μm to about 125 μm.

Adhesive for surface 22 can be placed on adhesive integrity layer 24 using a variety of techniques known to those skilled in the art such as casting, extruding, coating, spraying, screen-printing and laminating. Adhesive for adhesive surface 26 can be placed on adhesive integrity layer 24 using a variety of techniques known to those skilled in the art such as casting, extruding, coating, spraying, screen-printing and laminating.

The 20°–180° peel adhesion for the interface between adhesive carrier 12 and image carrier 16 is greater than the 20°–180° peel adhesion for the interface between adhesive carrier 12 and substrate 14 after a dwell time of about 24 hours and preferably ranges from about 10% to about 90% of the 20°–180° peel adhesion for the interface between adhesive carrier 12 and substrate 14 after a dwell time of about 24 hours.

Preferably, the percentage ranges from about 20 to about 80 in order to provide ease of removal but sufficient adhesion during use when measured after a 24 hour dwell time.

Adhesion at interfaces changes over time. Therefore at about 14 days of dwell time, the percentage ranges from about 10 to about 90 in order to provide predictable performance at the respective interfaces, based on choices of adhesives and how such adhesives interact with the surfaces such adhesive contact over time.

Typical substrates to which this embodiment of system 10 include painted metal, polymeric foam board, and the like.

Image Carrier Construction

Image carrier 16 should satisfy three requirements. First, it should bond positively to adhesive surface 26 of adhesive carrier 12 without lifting and curling, while still allowing for easy removal. Second, imageable surface 36 should accept a variety of a number of high quality graphic imaging methods including thermal transfer of colorant, inkjet printing, screen printing, offset printing, flexographic printing, laser printing, electrophotographic printing, electrostatic transfer printing, and combinations thereof. Thirdly, the image carrier must have sufficient internal strength to remove from adhesive surface 26 without delaminating or tearing. Preferably, imageable surface 36 can be tailored to receive specific types of printed image graphics 40, according to the differences in colorants, delivery, and the like. Aging characteristics and environmental resistance are important. In environmentally challenging environments, the image needs to be durable, i.e., using pigment-based colorants rather than dye or other colorants. Paper image carriers would be less preferred. However, in the non-challenging environments, non-release-coated papers and films are preferred for cost reasons and because there is less need for a robust material to withstand environmental forces.

The thickness of image carrier 16 can range from about 25 μm to about 300 μm and preferably from about 50 μm to about 150 μm.

While some single layer films can work as described above in relation to FIG. 1, image carrier 16 for the environmentally challenging environment having multiple layers 32, 34, and 36 that are extruded at the same time or have surface treatments or coatings that are applied after the film is made are preferred. Nonlimiting examples of image integrity layer 34 useful for the present invention in the environmentally challenging environment include polymeric films such as polyesters, polyvinyl chlorides, polyethylenes, polypropylenes, acid neutralized polyacrylic acids, vinyl acetate copolymers, and copolymers or terpolymers including ethylene and polyacrylic acid, where one or both major surfaces can be preferably treated to improve imaging quality in the case of imageable surface 36 and adhering quality in the case of adhesive-contacting surface 32.

Nonlimiting examples of processing capable of making the imageable surface 36 receptive to imaging include surface modification techniques such as Corona Treatment; liquid coatings dissolved or suspended in either organic solvents or water; or a 100% solids polymeric material that can be extruded or coextruded onto the imageable surface 36 either during or after formation of the image carrier 16. Nonlimiting examples of liquid coatings include ethylene vinyl acetate dispersions, alkyd resins in organic solvent, acrylate and urethane acrylate coatings in water or organic solvents, polyvinyl chloride in organic solvent, and all of the above combined with inorganic materials such as talc, clays, silica and pigments.

Preferred examples of image integrity layer 34 include polymeric films and papers on which an image can be placed or printed, such as polyolefin films, polyester films.

Adhesive-contacting surface 32 can be treated or not treated to match with the adhesive properties of adhesive surface 26 of adhesive carrier 12. Preferably, adhesive-contacting surface 32 is not treated for this embodiment.

Easy Application

Uses of the image graphic adhesive system 10 in environmentally challenging environments require predictable durability of the bond of adhesive carrier 12 to substrate 14 and the predictable durability of releasably adhered image carrier 16 to adhesive carrier 12 until a time of removal or repositioning. Because the image carrier 16 is to be released from the adhesive carrier, a feature of this system 10 is the presence of a coating or film on surface of the image carrier 16 that contacts the adhesive carrier 12 but permits easy release and repositioning. Duration for the image carrier 16 ranges from about 1 day to about 6 months and preferably from about one week to about 3 months. Environmentally challenging environments can be outdoor uses or indoor uses where strong chemicals are present in the air or ultraviolet light is present or temperature extremes are present or humidity extremes or extreme changes of relative humidity are present.

Environmentally non-challenging environments can be indoor uses where no strong chemicals are present in the air, or low amounts of ultraviolet light are present, or no temperature extremes and no rain or high humidity are present.

"Easy application" means that the image carrier and adhesive carrier are engineered to provide easy placement and removal of the image carrier without loss of holding power for the contemplated duration of the image carrier on the adhesive carrier.

While the image carrier 16 will be engineered for short duration, the adhesive carrier will remain in place for considerable periods of time, ranging from months to years depending on length of intended use of the image graphic adhesive system.

Nonlimiting examples of adhesives for use on surface 22 of adhesive carrier 12 to bond to substrate 14 include strong, tacky adhesives such as acrylic adhesives available from 3M such as No. 9458 and No. 966 adhesive transfer sheets resized into a larger area, and those adhesives disclosed in EPO Patent Publication EP 0 736 585 (Kreckel et al.), which describes a removable pressure sensitive adhesive that leads to adhesives that can be used to make pressure sensitive adhesive sheets with differential adhesion, the stronger adhesive serving on adhesive carrier 12 as surface 22 and the weaker adhesive serving as adhesive surface 26.

When transfer sheets 9458 and 966 are used, they can function as the entire adhesive carrier 12 because the transfer adhesive comprising a single adhesive composition inherently has highly differing adhesion to an untreated substrate as compared to an image carrier which has been provided with an adhesive-repellant release composition.

When other sheets are used, nonlimiting examples of adhesive integrity layer 24 include thermoplastic materials such as polyolefins and polyesters. Preferably, such polyesters include polyethylene terephthalates and such polyolefins include polypropylenes.

Nonlimiting examples of adhesives for use on adhesive surface 26 include acrylic adhesives from the same list of sheets as used for surface 22. Rubber adhesives are also suitable for use in environmentally controlled or non-challenging environments.

Because of the variation in location of the field of pressure sensitive adhesive, not in its formulation, conventional pressure sensitive adhesives presently used for image graphics can be acceptable for adhesive surface 26 of adhesive carrier 12. Nonlimiting examples of such pressure sensitive adhesives can generally be found in Satas, Ed. *Handbook of Pressure Sensitive Adhesives,* 2 Ed. (Von Reinhold Nostrand 1989). Of these adhesives, desirable adhesives include solvent-based acrylic and rubber adhesives, water-based acrylic adhesives, hot melt adhesives, microsphere-based adhesives, and silicone-based adhesives, regardless of their method of preparation.

Coating weights of such continuous layers of adhesives on adhesive carrier 12 can range from about 5 gm/m$^2$ to about 300 gm/m$^2$ and preferably about 20 gm/m$^2$ to about 150 gm/m$^2$.

Percent solids of such adhesives in the formulations to be applied on layer range from about 5% to about 100% and preferably from about 20 to about 100%.

Of these multitude of pressure sensitive adhesives, a few are preferred. Among the preferred are medium to high tack acrylic-based pressure-sensitive adhesives.

The thickness of adhesive carrier 12 can range from about 12 μm to about 500 μm, and preferably from about 25 μm to about 300 μm. Depending on the number of components in adhesive carrier 12, that thickness can be composed of an adhesive for surface 22 that ranges from about 12 μm to about 200 μm and preferably from about 25 μm to about 125 μm; an adhesive integrity layer 24 that ranges from about 0.0 μm to about 100 μm and preferably from about 12 μm to about 75 μm; and an adhesive for adhesive surface 26 that ranges from about 12 μm to about 200 μm and preferably from about 25 μm to about 125 μm.

Adhesive for surface 22 can be placed on adhesive integrity layer 24 using a variety of techniques known to those skilled in the art such as casting, extruding, coating, spraying, screen-printing and laminating. Adhesive for adhesive surface 26 can be placed on adhesive integrity layer 24 using a variety of techniques known to those skilled in the art such as casting, extruding, coating, spraying, screen-printing and laminating.

The 20°–180° peel adhesion for the interface between adhesive carrier 12 and image carrier 16 ranges from about 0.1 to about 50 percent of the 20°–180° peel adhesion for the interface between adhesive carrier 12 and substrate 14 after a dwell time of about 24 hours.

Preferably, the percentage ranges from about 1 to about 50 in order to provide ease of removal but sufficient adhesion during use when measured after a 24 hour dwell time.

Adhesion at interfaces changes over time. Therefore at about 14 days of dwell time, the percentage ranges from about 0.1 to about 50 in order to provide predictable performance at the respective interfaces, based on choices of adhesives and how such adhesives interact with the surfaces such adhesive contact over time.

Typical substrates to which this embodiment of system 10 is applied include painted metal, polymeric foam board, melamine-coated chipboard, polymethylmethacrylate, and the like.

Image Carrier Construction

Image carrier 16 should satisfy three requirements. First, it should bond positively to adhesive surface 26 of adhesive carrier 12 without lifting and curling, while still allowing for easy removal. Second, imageable surface 36 should accept a variety of a number of high quality graphic imaging methods including thermal transfer of colorant, inkjet printing, screen printing, offset printing, flexographic printing, laser printing, electrophotographic printing, electrostatic transfer printing, and combinations thereof. Thirdly, the image carrier must have sufficient internal strength to remove from adhesive surface 26 without delaminating or tearing. Preferably, imageable surface 36 can be tailored to receive specific types of printed image graphics 40, according to the differences in colorants, delivery, environmental conditions, and the like. Aging characteristics and environmental resistance are important. In environmentally challenging environments, the image needs to be durable, i.e., using pigment-based colorants rather than dye or other colorants. Paper image carriers would be less preferred. However, in the non-challenging environments, non-release-coated papers and films are preferred for cost reasons and because there is less need for a robust material to withstand environmental forces.

The thickness of image carrier 16 can range from about 25 μm to about 300 μm, and preferably from about 50 μm to about 150 μm. Depending on the number of components in image carrier 16, that thickness can be composed of a release coating for adhesive-contacting surface 32 that ranges from about 0.1 μm to about 25 μm and preferably from about 0.5 μm to about 20 μm; an integrity layer 34 that ranges from about 25 μm to about 300 μm and preferably from about 50 μm to about 150 μm; and an imageable surface 36 that ranges from about 0 μm to about 50 μm and preferably from about 5 μm to about 25 μm. Thicknesses will increase if image carrier 16 takes the form a multilayer film as now discussed.

While some single layer films can work as described above in relation to FIG. 1, image carrier 16 having multiple layers 32, 34, and 36 that are extruded at the same time or have surface treatments that are applied after the film is made are preferred.

Nonlimiting examples of image integrity layer 34 that are particularly preferred for use in environmentally challenging conditions include polymeric films such as polyesters, polyvinyl chlorides, polyethylenes, polypropylenes, acid neutralized polyacrylic acids, vinyl acetate copolymers, and copolymers or terpolymers including ethylene and acrylic acid, where one or both major surfaces can be preferably treated to improve imaging quality in the case of imageable surface 36 and adhering quality in the case of adhesive-contacting surface 32.

In the easy application, environmentally controlled application embodiment, the use of siliconized papers and films is preferred.

Nonlimiting examples of image integrity layer 34 useful for the environmentally controlled embodiment include siliconized paper and polymeric films such as polyesters, polyvinyl chlorides, polyethylenes, polypropylenes, acid neutralized polyacrylic acids, and vinyl acetate copolymers, where one or both major surfaces can be preferably treated to improve imaging quality in the case of imageable surface 36 and adhering quality in the case of adhesive-contacting surface 32.

Regardless of the environment of intended use, nonlimiting examples of processing capable of making the imageable surface 36 receptive to imaging include surface modification techniques such as Corona Treatment; liquid coatings dissolved or suspended in either organic solvents or water; or a 100% solids polymeric material that can be extruded or coextruded onto the imageable surface 36 either during or after formation of the image carrier 16. Nonlimiting examples of liquid coatings include ethylene vinyl acetate dispersions, alkyd resins in organic solvent, acrylate and urethane acrylate coatings in water or organic solvents, polyvinyl chloride in organic solvent, and all of the above combined with inorganic materials such as talc, clays, silica and pigments.

Preferred examples of integrity layer 34 for use in environmentally challenging conditions include polymeric films and papers on which an image can be placed or printed, such as polyolefin films.

Further image carrier 16 of the present invention can include naturally and synthetically-modified cellulosics, where it is preferred to have adhesive-contacting surface 32 treated with a silicone-containing release material to improve repositionability and removability of the image carrier 16 on the adhesive carrier 12.

As stated above, adhesive-contacting surface 32 is treated with a release coating. Nonlimiting examples of such coatings include silicones, polyethylenes, fluorosilicones and so-called low adhesion "backsize" materials (e.g. carbamates, siliconeureas, acrylates,) known to those skilled in the art.

Easy Application, Environmentally Controlled Uses

Uses of the image graphic adhesive system 10 in environmentally environments require predictable durability of the bond of adhesive carrier 12 to substrate 14 and the predictable durability of releasably adhered image carrier 16 to adhesive carrier 12 until a time of removal or repositioning. Moreover, the ease of application becomes important for the user of the product. As such, adhesive-contacting surface 32 is treated with a release coating to assist in the placement and removal of image carrier 16 from adhesive carrier. The duration for the image carrier 16 residing on adhesive carrier 12 ranges from about 1 day to about six months and preferably from about one week to about three months.

Nonlimiting examples of adhesives for use on surface 22 of adhesive carrier 12 to bond to substrate 14 include strong, tacky adhesives such as acrylic adhesives available from 3M and rubber adhesives.

Image Formation

Surface 36 of image graphic film 16 requires characteristics that permit imaging using at least one of the known imaging techniques. Nonlimiting examples of imaging techniques include solvent- and water-based inks, 100% solids ultraviolet curable inks, inkjet printing, thermal transfer, screen printing, offset printing, flexographic printing, and electrostatic transfer imaging.

Digital Imaging: Electrostatic Hardware and Software

Electrostatic transfer for digital imaging employs a computer to generate an electronic digital image, an electrostatic printer to convert the electronic digital image to a multicolor toned image on a transfer medium, and a laminator to transfer the toned image to a durable substrate. Electrostatic transfer processes are disclosed in U.S. Pat. No. 5,045,391 (Brandt et al.); U.S. Pat. No. 5,262,259 (Chou et al.); U.S. Pat. No. 5,106,710 (Wang et al.); U.S. Pat. No. 5,114,520 (Wang et al.); and U.S. Pat. No. 5,071,728 (Watts et al.), the disclosures of which are incorporated by reference herein, and are used in the Scotchprint™ electronic imaging process commercially available from 3M.

Nonlimiting examples of electrostatic printing systems include the Scotchprint™ Electronic Graphics System from 3M. This system employs the use of personal computers and electronically stored and manipulated images. Nonlimiting examples of electrostatic printers are single-pass printers (Models 9510 and 9512 from Nippon Steel Corporation of Tokyo, Japan and the Scotchprint™ 2000 Electrostatic Printer from 3M) and multiple-pass printers (Model 8900 Series printers from Xerox Corporation of Rochester N.Y., USA and Model 5400 Series from Raster Graphics of San Jose, Calif., USA)

Nonlimiting examples of electrostatic toners include Series 8700 toners from 3M. Nonlimiting examples of transfer media include Model 8600 media (e.g., 8601, 8603, and 8605) from 3M.

Nonlimiting examples of laminators for transfer of the digital electrostatic image include Orca III laminator from GBC Protec, DeForest, Wis.

Nonlimiting examples of protective layers include liquid-applied "clears" or overlaminate films. Nonlimiting examples of protective clears include the 8900 Series Scotchcal™ Protective Overlaminate materials from 3M. Nonlimiting examples of protective overlaminates include those materials disclosed in U.S. Pat. No. 5,681,660 (Bull et al.) and copending, coassigned, PCT Pat. Appln. Serial No. US96/07079 (Bull et al.) designating the USA and those materials marketed by 3M as Scotchprint™ 8626 and 3645 Overlaminate Films.

Digital Imaging: Ink Jet Hardware and Software

Thermal ink jet hardware is commercially available from a number of multinational companies, including without limitation, Hewlett-Packard Corporation of Palo Alto, Calif., USA; Encad Corporation of San Diego, Calif., USA; Xerox Corporation of Rochester, N.Y., USA; LaserMaster Corporation of Eden Prairie, Minn., USA; and Mimaki Engineering Co., Ltd. of Tokyo, Japan. The number and variety of printers changes rapidly as printer makers are constantly improving their products for consumers. Printers are made both in desk-top size and wide format size depending on the size of the finished graphic desired. Nonlimiting examples of popular commercial scale thermal ink jet printers are Encad's NovaJet Pro printers and H-P's 650C and 750C printers. Nonlimiting examples of popular desk-top thermal ink jet printers include H-P's DeskJet printers.

Piezo inkjet print heads are commercially available from Topaz Technologies (Sunnyvale, Calif.), Epson Corporation (Torrance, Calif.), Data Products (Woodland Hills, Calif.), Modular Ink Technologies (Dallas, Tex.), and others. These printheads differ in physical properties such as frequency and drop volume and the inks to be used in them often require different physical properties such as viscosity. Such print heads are used in piezo inkjet printers commercially available from Scitex/Idanit Technologies, Ltd. of Rishon Le Zion Israel; Raster Graphics of San Jose, Calif.; Vutek Inc. of Meredith, N.H.; Olympus Optical Co. Ltd. of Tokyo, Japan and others.

3M markets Graphic Maker Ink Jet software useful in converting digital images from the Internet, ClipArt, or Digital Camera sources into signals to thermal ink jet printers to print such images.

Ink jet inks are also commercially available from a number of multinational companies, particularly 3M which markets its Series 8551; 8552; 8553; and 8554 pigmented ink jet inks. The use of four principal colors: cyan, magenta, yellow, and black permit the formation of as many as 256 colors or more in the digital image.

Lithographic and Offset Printing

Flexographic and offset printing are also well known to those skilled in the art as explained in U.S. Pat. No. 5,322,761 (Kausch et al.) and U.S. Pat. No. 5,015,556 (Martens) for the former and U.S. Pat. No. 4,225,663 (Ball) and U.S. Pat. No. 5,670,294 (Piro) for the latter; all of which are incorporated herein by reference.

Thermal Transfer Printing

Thermal transfer procedures are well known to those skilled in the art as explained in U.S. Pat. No. 5,747,217 (Zaklika et al.); U.S. Pat. No. 5,843,617 (Chambers et al.); and U.S. Pat. No. 5,326,619 (Debe et al.), the disclosures of which are incorporated by reference herein.

Other Printing Means

Mechanical means of printing such as handwriting or electrophotographic means of printing such as photocopying can also be used. Moreover, laser printing techniques can also be used.

Uses of Image Graphics

Depending on the duration and environment for which the image graphic adhesive system is designed, image graphics can be displayed in a multitude of locations. One skilled in the art can choose from the matrix of possible embodiments to best fit the use of the image graphic with the environment and application effort desired. Any advertising that depends on changing graphics can benefit from this invention, such as point-of-purchase displays, sales promotion posters, and the like. Likewise, information that depends on changing graphics, such as announcements in office, school, and public buildings, also can use the system. The system is primarily designed for walls and other vertical surfaces, although it is possible to use the system on horizontal surfaces if the adhesive surface 26 is not adversely affected. The system can be front-lit or back-lit, because embodiments of the system can provide for opaque, translucent, or transparent construction of the adhesive carrier 12 and the image carrier 16. In other words, the system can be applied to industrial and consumer use by those skilled in the art in any possible variation to advantage of ease of installation and removal.

Other embodiments will become apparent from the following examples using the following tests.

Test Methods

90° Peel Adhesion

90° Peel adhesion tests were performed for all examples for (1) adhesive carrier to substrate bonds and (2) image carrier to adhesive carrier bonds. The test was performed using DIN (Deutsche Industrie Norm EN 28510 Part 1). The rate of peel was 300 mm/min.; the width of the material being removed was 2.54 cm.

180° Peel Adhesion

Adhesive bonds were prepared as above under 90° Peel Adhesion. Peel force of the siliconized image carriers from the adhesive layer was measured at a high rate of 2.8 m/min DIN (Deutsche Industrie Norm EN 28510 Part 2)

For both Peel Adhesion tests, three samples were measured instead of five as specified in the DIN test method. All samples were overrolled at the rate of 300 mm/min. which is not specified in the DIN test method. The dwell times and choice of substrates varied according the following Examples.

EXAMPLES

Example 1

A painted sheet metal sign board designed for the display of advertising graphics was chosen as a substrate. The two surfaces used for mounting graphics were made of painted steel and had dimensions of 85 cm×60 cm.

A DIN A4 (21 cm×29.7 cm) sheet of double-coated adhesive sheet having a high tack acrylic PSA on one side and a low tack acrylic PSA on the other side, available as Tape No. 9415 High Tack/Low Tack Double-Coated Tape from 3M Company, St. Paul, Minn., USA, was laminated to cover a portion of one of the two surfaces of the advertising board. The sheet, available in roll form with a single liner applied to the low adhesion side of the sheet, was unrolled and cut to the appropriate size. The unlinered high-adhesion side was applied to the painted metal surface using a rubber-coated roller. The liner was removed from the low adhesion side. A sheet of recyclable notepad paper (50 g, available as No 367405008 from Landré of Vianen, the Netherlands) bearing a hand written message and having the same dimensions as the exposed adhesive on the advertising board was applied to the exposed low adhesion side of the double-coated adhesive sheet by hand.

The paper image graphic could be easily removed from the adhesive surface after 24 hours and be reapplied. Since the paper had little memory, it did not curl at the edges on removal from the adhesive. No edge lift occurred after reapplication. The double-coated adhesive sheet was removable from the substrate after several weeks of storage at room temperature and ambient humidity.

The peel adhesion of the adhesive carrier from the substrate and the peel adhesion of the image graphic from the adhesive carrier were evaluated quantitatively by the 90° peel adhesion test (performed according to the method described under Test Methods, above).

Comparative Example 1

Example 1 was repeated with the exception that the low adhesion side of the double-coated adhesive sheet was applied to the painted metal substrate. This was accomplished by first applying a second liner to the high adhesion side, stripping the liner from the low adhesion side and applying the adhesive thus exposed to the painted metal substrate. The liner was then removed from the high adhesion side and the paper was then applied to the higher adhesion side of the adhesive sheet.

The paper image graphic was not removable after a dwell time of 30 seconds and tore during attempts to remove the paper. The low adhesion side of the double-coated adhesive sheet lifted partially from the substrate when attempts were made to remove the paper from the high adhesion side of the sheet.

Example 2

Example 1 was repeated with the exception that a sheet of paper suitable for use with a black and white photocopier (available as FAVORIT X, No. 9366/080/05/04—80 g) was printed with an image using a photocopier. The paper bearing the photocopied image was used as an image graphic.

The image graphic was then laminated by hand to the exposed low adhesion side of the double-coated adhesive double-coated adhesive sheet after removal of the liner. The printed paper image graphic was removable from the adhesive surface after 24 hours with no lifting of the double-coated adhesive sheet from the substrate.

Example 3

Example 1 was repeated with the exception that a sheet of paper suitable for use with a laser printer (available as FAVORIT X, No. 9366/080/05/04—80 g) was printed with an image using a laser printer. The printed paper was used as an image graphic.

The image graphic was then laminated by hand to the exposed low adhesion side of the double-coated adhesive after removal of the liner. The printed paper image graphic was removable from the adhesive surface after 24 hours with no lifting of the double-coated adhesive sheet from the substrate.

Example 4

Example 1 was repeated with the exception that a printable film consisting of a 60$\mu$ thick, white biaxially-oriented polypropylene (BOPP), a three layer film comprising a core layer of cavitated polypropylene, commercially available as LABELYTE 60 LL 247 from Mobil Plastics, was printed with a red 3M logo using one-color sheet offset printing, thus forming the image graphic. The image was applied to the side of the film made suitable for printing by corona treatment. The image graphic was applied by adhering the non-printed side to the low adhesion side of the double-coated adhesive sheet.

Tests results showed that the image graphic comprising a printed film could be removed easily after application and reapplied. There was no lifting of the double-coated adhesive sheet from the substrate during removal of the film and the film was removed cleanly from the adhesive surface. No adhesive residue was present on the image graphic after removal, and no edge curling of the film was observed.

Example 5

3M Scotchcal™ Film 3500, comprising a 100 micron thick plasticized PVC backing and an acrylic PSA, was coated with a 5 micron layer of primer on the non-adhesive coated side. A double-coated adhesive sheet was prepared by laminating 3M removable transfer adhesive 9449 to primed film of the sheet just prepared.

The double-coated adhesive sheet was applied to the advertising board as described in Example 1 with the higher-adhesion original Scotchcal™ adhesive towards the substrate.

An image graphic was prepared by printing a graphic image onto a sheet of paper printable by electrostatic methods, available as #8612 Electrostatic Paper from 3M Company, St. Paul, Minn., USA, using an electrostatic printing process known as SCOTCHPRINT™ Electronic Graphic System from 3M. The image graphic thus created was applied to the exposed lower adhesion side of the double-coated adhesive sheet. The image graphic was removable from the adhesive surface without lifting the adhesive from the substrate. The double-coated adhesive sheet of Example 5 was removable from the substrate as well with less force as compared to the adhesive of Examples 1–4.

Example 6

An 8 mm thick, rigid signboard made of foamed polyvinyl chloride with a slightly textured surface, commercially available as FOREX™ from Airex AG (Sins, Switzerland) was employed as a substrate. The double coated adhesive sheet of Example 5 was applied to the Forex (TM) board as described in Example 1 with the original Scotchcal adhesive towards the substrate.

An image graphic was created by screen-printing onto a glossy coated graphic paper, available as Ikonorex I 5695 (115 g) from Zanders (Bergisch-Gladbach, Germany). The graphic was applied to the exposed lower adhesion side of the double-coated adhesive sheet. The image graphic was removable from the adhesive surface without lifting the double-coated adhesive sheet from the substrate. The double-coated adhesive sheet was removable in one piece from the Forex substrate without damaging it and leaving no adhesive residue.

Example 7

A double-coated adhesive sheet was prepared by first coating a layer of mixture of 90 parts by weight of a first water-based acrylic pressure-sensitive adhesive (available as Acronal 35D from BASF) and 10 parts by weight of a second water-based acrylic pressure-sensitive, (available as Acronal A 213 S from BASF), onto one side of a 376 $\mu$m polyethylene terephthalate (PET) film, commercially available as Hostaphan RN 36 from Hoechst, which had been corona-treated on both sides. The adhesive was first thickened with 1% by weight Collacral PU from BASF and then applied to the film by knife-coating at a dry coating thickness of about 50 microns and the dried in a forced air oven at 100° C. for about 5 minutes. A release liner was laminated to the dried adhesive layer.

The single-coated sheet thus prepared was coated on the other side with a water-based acrylic pressure-sensitive, available as Acronal A 213 S from BASF, which was first thickened, then coated and dried as above, thus providing a double-coated adhesive sheet. The second side of the sheet, also protected temporarily with a liner, had higher adhesion.

The double-coated adhesive sheet was applied to the substrate with the higher adhesion side toward the substrate.

An image graphic was prepared by offset printing onto a 115 g matte graphic paper for offset printing, available as OPUS No. 1370 115 05 10 from Smurfrit Condat (Finland) and applied to the exposed adhesive.

The image graphic was removed from the adhesive surface. The adhesive surface was then deliberately contaminated with particulate manner consisting of a mixture of 38.4% by weight peat, 18.0% by weight cement, 18.0% kaolin and 18.0% diatomaceous earth, 6.25% mineral oil and 1.05% carbon black and 0.3% ferrous oxide. One gram of the above mixture was sprinkled evenly onto an adhesive sheet measuring 15 cm×15 cm. The contaminated surface was then washed with a dilute aqueous soap solution, rinsed and allowed to dry and the image graphic was reapplied. Adhesion values of the cleaned adhesive surface had returned to 80% of the uncontaminated value. This process of removal, cleaning, and reactivation of the adhesive could be repeated as many as 10 times without adhesion values declining more than about 30%.

Example 8

A double-coated adhesive sheet was prepared in two steps by first coating a layer of mixture of 90 parts by weight of a first water-based acrylic pressure-sensitive adhesive, available as ACRONAL 35D from BASF, and 10 parts by weight of a second water-based acrylic pressure-sensitive, available as ACRONAL A 213 S from BASF, onto one side of a 36μ polyethylene terephthalate (PET) film, commercially available as HOSTAPHAN RN 36 from Hoechst, which had been corona treated on both sides. The adhesive mixture was first thickened with 1% by weight Collacral PU from BASF and then applied to the film by knife-coating at a thickness to provide a dry coating thickness of about 50 microns and dried in a forced air oven at 100° C. for about 5 minutes. A release liner was laminated to the dried adhesive layer.

The single-coated sheet thus prepared was laminated to an acrylic transfer sheet, available from 3M Company as 9470 Adhesive Transfer Tape. The double-coated adhesive sheet was applied to Forex with the 9470 Transfer Tape side towards the Forex substrate.

An image graphic was prepared by offset printing onto a 115 g matte graphic paper for offset printing, available as OPUS No. 1370 115 0510 from Smurfrit Condat (Finland). The image graphic was applied to the exposed adhesive.

The image graphic was removable from the double-coated adhesive sheet. The double-coated adhesive sheet was also removable from the FOREX substrate, but with very high force required.

Comparative Example 2

A double-coated adhesive sheet was prepared by first coating a layer of a water-based acrylic pressure-sensitive adhesive, available as ACRONAL 35D from BASF, onto one side of a 36μ polyethylene terephthalate film, commercially available as HOSTAPHAN RN 36 from Hoechst, which had been corona treated on both sides. The adhesive was first thickened with 1% by weight Collacral PU from BASF, then applied to the film by knife-coating at a dry coating thickness of about 50 microns and the dried in a forced air oven at 100° C. for about 10 minutes. A release liner was laminated to the dried adhesive layer. This adhesive layer had lower adhesion.

The single-coated sheet thus prepared was coated on the other side with a water-based acrylic pressure-sensitive, available as ACRONAL A 213 S from BASF, which was thickened, coated and dried as above, thus providing a double-coated adhesive sheet. This second side of the sheet had higher adhesion.

The double-coated adhesive sheet was applied to the substrate with the higher adhesion side toward the substrate.

The image graphic was prepared by offset printing onto a 115 g matte graphic paper for offset printing, available as OPUS No. 1370 115 05 10 from Smurfrit Condat (Finland).

The image graphic was adhered to the exposed adhesive layer having lower adhesion. The paper image graphic did not adhere sufficiently to the adhesive, however. The image graphic could not support its own weight in a vertical position and fell off of its own accord, indicating that the peel adhesion value for the image graphic to the adhesive carrier was too low.

Example 9

A 32 micron clear, corona-treated biaxially-oriented polypropylene (BOPP) (available as Propafilm LMO 30 from ICI) is hot-melt coated with a 50 micron layer of rubber/resin based pressure-sensitive adhesive comprising 33 parts by weight synthetic rubber (available as CARIFLEX TR 1107 from Shell), 44 parts hydrocarbon resin (Escorez 1310 from Exxon Chemicals) and 22 parts polyterpene resin (available as Zonarez A25 from Arizona Chemicals).

The other side of the BOPP film was coated in the same manner with a 50 micron layer of rubber/resin based pressure-sensitive adhesive available as Durotak H1525 from National Starch.

The adhesive side of the double-coated adhesive sheet based on Cariflex was then applied to a melamine-coated chipboard panel.

The image carrier of Examples 8 and C2 (offset printed paper) was then adhered to the exposed adhesive of the double-coated adhesive sheet.

The image graphic, a matte-finished high strength paper, was removable from the rubber/resin adhesive, even though adhesion values were, in general, higher than those measured with acrylic adhesive systems used for adhesion to the image graphic.

Example 10

A clear double-coated adhesive sheet was prepared by coating a polymer-containing syrup (90 parts by weight isooctyl acrylate, 10 parts by weight fumed silica (AEROSIL R972 from Degussa and 0.2 parts by weight photoinitiator (available as IRGACURE 651 from Ciba-Geigy) onto a polyester carrier as described in Example 5. Each of the sides of the polyester carrier was coated simultaneously via knife coating with two slightly differing polymeric syrups, each at a thickness of 100 microns. The syrup-coated polyester was then protected between two siliconized polyethylene terephthalate (PET) liners and the adhesive syrups then cured using UV radiation as described in European Patent Application EP 0 736 585.

The syrup used for one side contained, in addition to the components mentioned above, 2.0% tetrapropylene glycol diacrylate (TPGDA) crosslinking agent. The syrup used for the other side contained 0.5% TPGDA crosslinking agent. The adhesive layer having the lower amount of crosslinker had higher adhesion.

The double-coated adhesive sheet thus prepared was applied to an 8 mm thick transparent sheet of polymethylmethacrylate (PMMA) by removing the liner from the adhesive side made with 0.5% crosslinking agent (higher adhesion side) and laminating the adhesive to the polymethylmethacrylate sheet. The double-coated adhesive applied to the PMMA formed a clear assembly.

The image graphic was prepared by flexographic printing on a 80μ white coextruded biaxially-oriented cavitated polypropylene film (BOPP), available as TRESPAPHAN OWD 80 from Hoechst-Trespaphan (Neunkirchen, Germany). The printable side of the film had been corona-treated.

The image graphic was applied to the double-coated adhesive sheet in such a fashion that the imaged side was in contact with the exposed adhesive face of the double-coated adhesive sheet. Because of the clear substrate and the clear double-coated adhesive sheet, the image could be viewed through the substrate.

Example 11

Example 10 was repeated with the exception that the image graphic was printed on both sides. The image on the first side of the image carrier could be viewed through the PMMA substrate and the clear double-coated adhesive sheet. The image on the second side of the image carrier could be viewed from the other side Example 12

A double-coated adhesive was prepared using a 80$\mu$ white biaxially-oriented coextruded, cavitated polypropylene film (BOPP), available as TRESPAPHAN OWD 80 from Hoechst-Trespaphan (Neunkirchen, Germany), as a carrier for the double-coated adhesive sheet. The printable side of the film had been corona-treated and was printed with an image by flexographic printing. The printed carrier was corona-treated on both sides.

The printed adhesive carrier thus prepared was coated with a polymer-containing syrup on both sides and simultaneously covered with two siliconized polyethylene terephthalate (PET) liners. The syrup-coated carrier (with liners) was subjected to UV radiation to polymerize the syrup as described in EP 0 736 585. The coating and polymerization process as well as the chemical composition of the two adhesive syrups was identical to that described in Example 10.

The adhesive layer of the double coated having the lesser amount of crosslinker (0.5%) was applied to the glass substrate.

An image graphic was prepared by printing a paper (available as OPUS No. 1370 115 0510, 115 g matte graphic paper from Smurfrit Condat) using ink-jet printing technology. Such a paper graphic was applied to the more highly crosslinked adhesive coating of the adhesive carrier and could be removed as shown in Table 2.

The double-coated adhesive sheet was removable from the substrate and the image graphic was removable from the double-coated adhesive sheet. The printing on the carrier of the double-coated adhesive sheet could clearly be seen through the glass substrate, displaying a first message through the glass, while at the same time bearing a removable and changeable image graphic on the other face.

Example 13

Example 12 was repeated, with the exception that the image carrier was printed using thermal transfer technology

TABLE 1

| | | Conventional Application/Environment | | | | |
|---|---|---|---|---|---|---|
| | | SHEET | | | IMAGE GRAPHIC | |
| Ex. | SUBSTRATE | PSA (adhered to substrate) | Carrier | PSA (adhered to image graphic) | Sheet | Image |
| 1 | Painted metal | acrylic | polyester | acrylic | paper | hand-written |
| C1 | Painted metal | acrylic | polyester | acrylic | paper | hand-written |
| 2 | Painted metal | acrylic | polyester | acrylic | paper | photocopy |
| 3 | Painted metal | acrylic | polyester | acrylic | paper | laser print |
| 4 | Painted metal | acrylic | polyester | acrylic | film | offset printing |
| 5 | Painted metal | acrylic | PVC | acrylic | paper | electrostatic printing |
| 6 | PVC-foam board | acrylic | PVC | acrylic | paper | screen-printing |
| 7 | PVC-foam board | acrylic | polyester | acrylic | paper | offset printing |
| 8 | PVC-foam board | acrylic | polyester | acrylic | paper | offset printing |
| C2 | PVC-foam board | acrylic | polyestcr | acrylic | paper | offset printing |
| 9 | melamine coated chipboard | rubber | BOPP | rubber | paper | offset printing |
| 10 | PMMA | acrylic | polyester | acrylic | film | flexographic printing |
| 10 | PMMA | acrylic | polyester | acrylic | film | flexographic printing |
| 12 | glass | acrylic | BOPP (printed) | acrylic | paper | ink-jet printing |
| 13 | glass | acrylic | BOPP (printed) | acrylic | paper | thermal transfer printing |

TABLE 2

| Ex. | 90° Peel adhesion Double-coated adhesive sheet from substrate (N/2.54 cm, 24 h dwell) | 90° Peel adhesion Double-coated adhesive sheet from substrate (N/2.54 cm, 24 h dwell) | 90° Peel adhesion Image graphic from PSA (N/2.54 cm, 24 h dwell) | 90° Peel adhesion Image Graphic from PSA (N/2.54 cm, 14 d dwell) |
|---|---|---|---|---|
| 1 | 9.47 | 11.23 | 1.81 | 1.92 |
| C1 | 0.78 | 1.23 | Paper Split | Paper Split |
| 2 | 9.47 | 11.23 | 1.58 | 1.89 |
| 3 | 9.47 | 11.23 | 1.58 | 1.89 |
| 4 | 9.47 | 11.23 | 0.44 | 0.48 |
| 5 | 5.85 | 3.73 | 0.47 | 0.59 |
| 6 | 5.76 | 6.28 | 1.23 | 1.32 |
| 7 | 5.55 | 5.70 | 1.73 | 3.31 |
| 8 | 12.69 | 14.56 | 1.73 | 3.31 |
| C2 | 5.55 | 5.70 | falls off | falls off |
| 9 | 12.15 | 14.01 | 5.63 | 6.09 |
| 10 | 9.34 | 13.72 | 2.78 | 3.35 |
| 11 | 9.34 | 13.72 | 2.78 | 3.35 |
| 12 | 4.48 | 6.28 | 2.55 | 3.29 |
| 13 | 4.48 | 6.28 | 2.55 | 3.29 |

A painted sheet metal sign board designed for the display of advertising graphics was chosen as a substrate.

A DIN A4 (21.0 cm×29.7 cm) sheet of double-coated adhesive having a tack acrylic PSA on one side and a low tack acrylic PSA on the other side, available as Tape No.

9415 High Tack/Low Tack Double-Coated Tape from 3M Company, St. Paul, Minn., USA, was laminated to cover a portion one of the two surfaces of the advertising board. The sheet, available in roll form with a single liner on the low adhesion side, was first unrolled and cut to the appropriate size. A second liner was then adhered to the high adhesion side. The liner was then removed from the low adhesion side and the adhesive adhered to the painted steel substrate using a rubber-coated roller.

An image graphic was prepared by writing a message by hand using a felt-tipped marking pen on a siliconized paper, available as 75 g Release PMC (standard low release level) from Lohjan Paperi (Finland). The paper was siliconized only on one side and the writing was applied to the non-siliconized surface of the paper.

The image graphic was then adhered to the double-coated adhesive sheet with the silicone-coated side of the image carrier against the exposed higher adhesion side of the double-coated sheet.

The image carrier was easily removable from the high adhesion surface without tearing the image graphic or distorting it. The double-coated adhesive sheet remained adhered to the substrate during removal of the graphic although a lower tack adhesive was applied to the substrate. The double-coated adhesive sheet was removable from the substrate.

The peel adhesion of the adhesive carrier from the substrate was evaluated quantitatively by the 90° peel adhesion test (performed according to the method described under Test Methods, above) and the peel adhesion of the image graphic from the adhesive carrier was evaluated quantitatively by the 180° peel adhesion test (performed according to the method described under Test Methods, above).

Example 15

Example 14 was repeated with the exception that the siliconized-paper image carrier was imaged on the non-siliconized side using a photocopier. Essentially the same results were obtained as in Example 14.

Example 16

Example 14 was repeated with the exception that the siliconized-paper image carrier was imaged on the non-siliconized side using a laser printer. Essentially the same results were obtained as in Example 14.

Example 17

Example 14 was repeated with the exception that the siliconized-paper image carrier was imaged on the non-siliconized side using offset printing. Essentially the same results were obtained as in Example 14.

Comparative Example 3

Example 14 was repeated with the exception that the double-coated adhesive sheet was applied to the substrate with the high adhesion side facing the substrate.

The image graphic was placed on the exposed lower adhesion side and was not securely adhered. When the assembly was placed in the vertical position, the graphic could not support its own weight and separated from the adhesive without application of any external peel forces. The double-coated adhesive sheet could be removed from the substrate cleanly, but the forces were very high.

Example 18

Example 14 was repeated with the exception that a second siliconized paper, available as 75 g Release PMC MR30 (high release system) from Lohjan Paperi (Finland), was screen printed on the non-siliconized side and used as an image graphic.

The image graphic was then adhered to the double-coated adhesive sheet with the silicone-coated side of the image carrier against the higher adhesion side of the double-coated adhesive sheet. The adhesion was sufficient to securely bond the image graphic to the substrate.

The image carrier was cleanly removable from the adhesive surface without tearing the image graphic or distorting it. The double-coated adhesive sheet remained adhered to the substrate during removal of the graphic, but could itself be removed from the substrate as well.

Example 19

Example 14 was repeated with the exception that the image graphic comprised a 90 g paper, available as Silox 90 CL from Akrosil (Heerlen, The Netherlands). The image graphic, prepared by ink-jet printing on the non-siliconized surface of the paper, was applied to the high adhesion side of the double-coated adhesive sheet, again as in Example 14. The image quality and handleability of the graphic prepared on this paper was superior (to the one use in ex. 14) for the intended use.

The image carrier was easily removable from the adhesive surface without tearing the image graphic or distorting it. The double-coated adhesive sheet remained adhered to the substrate during removal of the graphic, but could be removed from the substrate as well.

Example 20

A double-coated adhesive sheet was prepared by first coating a layer of water-based acrylic pressure-sensitive adhesive, available as ACRONAL A 213 S from BASF (thickened with 1% by weight Collacral PU from BASF), onto a siliconized release liner and drying it in a forced air oven. The thickness of the dried adhesive layer was about 50 microns.

The layer of adhesive thus prepared was then laminated to the non-adhesive side of a plasticized polyvinyl chloride sheet bearing a layer of acrylic adhesive, available as Scotchcal™ 3500 Graphic Film/White from 3M Company, St. Paul, Minn., USA, to form a double-coated adhesive sheet.

The double-coated adhesive sheet was adhered to the substrate, a hard PVC foam display board, available as Forex™ from Airex AG (Sins, Switzerland). The acrylic adhesive forming an original part of the Scotchcal film was applied to the substrate.

An image graphic was prepared by four-color offset printing on the paper side of a 50 g polyethylene-coated paper No. 67850/60-30, available from PKL (Linnich, Germany). The polyethylene side of the image graphic was then adhered to the exposed surface of the double-coated adhesive sheet The image carrier was removable from the adhesive surface and the double-coated adhesive sheet was removable from the substrate. In Example 20, the image graphic released with a smooth peel with more secure adhesion as compared to Example 19.

Comparative Example 4

Example 20 was repeated with the exception that the polyethylene-coated paper was applied with the non-PE-coated side to the exposed adhesive surface of the double-coated adhesive sheet.

The polyethylene-coated paper was not removable from the adhesive and attempts to remove it resulted in tearing of the image graphic.

Comparative Example 5

A DIN A4 sheet (21 cm×29.7 cm) of double-coated adhesive having a high tack acrylic PSA on one side and a low tack acrylic PSA on the other side, available as 9415 High Tack/Low Tack Double-Coated Tape from 3M Company, St. Paul, Minn., USA, was laminated to cover one of the two painted steel surfaces of the advertising board described in Example 14. The liner was removed from the lower adhesion side and then the lower adhesion side was applied to the painted metal surface using a rubber-coated roller.

An image graphic was prepared by four-color offset printing on the paper side of a 50 g polyethylene-coated paper No. 67850/60-30, available from PKL (Linnich, Germany). It was then laminated with the coated side against the image carrier.

The polyethylene-coated paper was not removable from the high adhesion side of the 3M No. #9415 double-coated adhesive sheet. Lifting of the low adhesion side from the substrate occurred when attempts were made to remove the paper from the adhesive surface.

Example 21

A printed film was prepared from 80$\mu$ white coextruded, biaxially-oriented cavitated polypropylene film (BOPP), available as TRESPAPHAN OWD 80 from Hoechst-Trespaphan (Neunkirchen, Germany). The printable side of the film had been corona-treated and was printed with an image by flexographic printing. The printed carrier was corona-treated on both sides.

A double-coated adhesive sheet was prepared by coating a polymer-containing syrup (90 parts by weight isooctyl acrylate, 10 parts by weight fumed silica (AEROSIL R972 from Degussa) and 0.2 parts by weight photoinitiator (available as IRGACURE 651 from Ciba-Geigy) onto the printed BOPP film described above. Each of the sides of the BOPP film was coated simultaneously via knife coating with two slightly differing polymeric syrups, each at a thickness of 100 microns. The syrup-coated BOPP was then protected between two siliconized polyethylene terephthalate (PET) liners and the adhesive syrups then cured using UV radiation as described in European Patent Application EP 0 736 585.

The syrup used for the printed side of the BOPP contained, in addition to the isooctyl acrylate and fumed silica components mentioned above, 2.0% tetrapropylene glycol diacrylate (TPGDA) crosslinking agent. The syrup used for the non-printed side of the BOPP contained 0.5% TPGDA crosslinking agent. The adhesive layer having the lower amount of crosslinker had higher adhesion.

The printed double-coated adhesive sheet thus prepared was applied to an 8 mm thick transparent sheet of polymethylmethacrylate (PMMA) by removing the liner from the adhesive side made with 2.0% crosslinking agent (lower adhesion side) and laminating the adhesive to the polymethylmethacrylate sheet. The double-coated adhesive applied to the PMMA formed a clear assembly and the print on the BOPP adhesive carrier was visible through the PMMA substrate.

3M Company No. 8612 Electrostatic paper was coated on the side opposite the electrostatic coating with a mixture of UV-curable silicone-release materials. A silicone thickness of about 1 micron was applied to the paper and UV cured using high intensity UV lamps. The release material employed was a 70:30 weight to weight mixture of two UV-curable silicones/acrylates: RC 706 and RC 711, available from Th. Goldschmidt AG, Essen, Germany.

The siliconized image carrier was imaged by electrostatic printing using the 3M Scotchprint™ imaging process on the side bearing the coating intended to receive such an image.

The image carrier was applied to the exposed adhesive layer described above, so that in the final construction two images were visible: one through the transparent substrate and present on the substrate side of the adhesive carrier and a second one applied to the exposed surface of the image carrier.

Example 22

A 32 micron clear, corona-treated biaxially-oriented polypropylene (BOPP) (available as Propafilm LMO 30 from ICI) is hot-melt coated with a 50 micron layer of rubber/resin based pressure-sensitive adhesive comprising 33 parts by weight synthetic rubber (available as CARIFLEX TR 1107 from Shell), 44 parts hydrocarbon resin (Escorez 1310 from Exxon Chemicals) and 22 parts polyterpene resin (available as Zonarez A25 from Arizona Chemicals).

The other side of the BOPP film is coated in the same manner with a 50 micron layer of rubber/resin based pressure-sensitive adhesive available as Durotak H1525 from National Starch.

The adhesive side of the double-coated adhesive sheet coated with the National Starch pressure-sensitive adhesive was then applied to the surface of a melamine-coated chipboard.

The image carrier of Example 18, a silicone-coated paper, available as 75 g Release PMC MR30 (high release system) from Lohjan Paperi (Finland), was flexographically printed on the non-siliconized side and used as an image graphic.

Example 23

In Example 23, the adhesive carrier 12 consisted of a single 25 micron layer of pressure-sensitive adhesive in the form of Acrylic Transfer Tape 9458 available from 3M. No polymeric film was present. The transfer adhesive was applied to the substrate, in this example a melamine-coated chipboard.

The image carrier of Example 18, a silicone-coated paper, was imaged using offset printing and adhered to the exposed surface of the transfer sheet.

The image graphic could be removed cleanly and the double-coated adhesive remained adhered to the substrate.

Example 24

The clear double-coated adhesive employed in Example 14 was adhered to a polymethylmethacrylate (PMMA) substrate. The lower adhesion side was adhered to the substrate.

An image graphic was prepared from a 70 micron white, biaxially-oriented polypropylene (BOPP) film available as Lithor 70LX002 from Mobil Plastics, coated on one side with a mixture of two 100% solids UV-curable silicone/acrylate-based release materials, made by combining 50 parts by weight RC 708 from Th. Goldschmidt AG (Essen, Germany) and 50 parts by weight RC 711 from Th. Goldschmidt AG. The mixture of release materials was coated onto the BOPP using a 5-roll coating station to provide a coating of about 1 micron. The release material was then UV cured in an inert atmosphere by passing under high intensity mercury UV lamps to cure.

The non-siliconized surface of the film-based image carrier was then printed using flexographic printing.

TABLE 4

| Ex. | 90° Peel adhesion Double-coated adhesive sheet from substrate (N/2.54 cm, 24 h dwell) | 90° Peel adhesion Double-coated adhesive sheet from substrate (N/2.54 cm, 14 d dwell) | 180° Peel adhesion Image graphic from PSA (N/2.54 cm, 24 h dwell) | 180° Peel adhesion Image Graphic from PSA (N/2.54 cm, 14 d dwell) |
|---|---|---|---|---|
| 14 | 0.78 | 1.23 | 0.03 | 0.07 |
| 15 | 0.78 | 1.23 | 0.03 | 0.07 |
| 16 | 0.78 | 1.23 | 0.03 | 0.07 |
| 17 | 0.78 | 1.23 | 0.03 | 0.07 |
| C3 | 9.47 | 11.23 | falls off | falls off |
| 18 | 0.78 | 1.23 | 0.12 | 0.74 |
| 19 | 0.78 | 1.23 | 0.26 | 0.33 |
| 20 | 5.76 | 6.28 | 4.75 | 5.29 |
| C4 | 5.76 | 6.28 | Paper Split | Paper Split |
| C5 | 1.47 | 1.89 | 14.34 | 19.83 |
| 21 | 8.43 | 9.14 | 0.10 | 0.12 |
| 22 | 12.15 | 14.01 | 0.334 | 0.291 |
| 23 | 7.56 | 8.1 | 0.12 | 0.74 |
| 24 | 0.85 | 0.71 | 0.076 | 0.285 |

Example 25

An 25 micron thick acrylic double-coated transfer adhesive sheet, available as #9458 Transfer Tape from 3M Company, was laminated to one side of an 8 mm thick, rigid signboard made of foamed polyvinyl chloride with a slightly textured surface, commercially available as Forex™ from Airex AG (Sins, Switzerland).

A co-extruded film comprising a polyethylene base layer and an ethylene vinyl acetate (EVA) print receptor layer was

TABLE 3

| | | Easy Application/Environment | | | | | |
|---|---|---|---|---|---|---|---|
| | | SHEET | | | IMAGE GRAPHIC | | |
| Ex. | SUBSTRATE | PSA (adhered to substrate) | Carrier | PSA (adhered to image graphic) | Coating | Sheet | Image |
| 14 | Painted metal | acrylic | polyester | acrylic | silicone | paper | hand-written |
| 15 | Painted metal | acrylic | polyester | acrylic | silicone | paper | photocopy |
| 16 | Painted metal | acrylic | polyester | acrylic | silicone | paper | laser print |
| 17 | Painted metal | acrylic | polyester | acrylic | silicone | paper | offset printing |
| C3 | " | acrylic | polyester | acrylic | silicone | paper | offset printing |
| 18 | " | acrylic | polyester | acrylic | silicone | paper | screen printing |
| 19 | " | acrylic | polyester | acrylic | silicone | paper | ink jet printing |
| 20 | PVC foam board | acrylic | PVC | acrylic | PE | paper | offset printing |
| C4 | PVC foam board | acrylic | PVC | acrylic | None | paper | offset printing |
| C5 | PVC foam board | acrylic | polyester | acrylic | PE | paper | offset printing |
| 21 | glass | acrylic | BOPP printed | acrylic | silicone | paper | electrostatic printing |
| 22 | melamine coated chipboard | rubber | BOPP | rubber | silicone | paper | flexographic printing |
| 23 | melamine coated chipboard | acrylic double-coated adhesive sheet | | | silicone | paper | offset printing |
| 24 | PMMA | acrylic | polyester | acrylic | silicone | film | flexographic printing |

prepared according to the disclosure of U.S. Pat. No. 5,721,086 (Emslander et al.) The coextruded film was then coated with an adhesion modifying silicone coating on the side opposite the print receptor layer. The print receptive layer was then imaged by four-color offset printing.

The image graphic was then laminated with the siliconized side of the image facing the acrylic transfer sheet. The film-based image graphic was easily removable from the transfer adhesive and was not distorted or torn during the removal process, so as to render it reusable. The transfer adhesive was not removable from the substrate without special methods. The transfer adhesive sheet was removable from the substrate, however, if it was covered with a strong paper and peeled off together with this paper.

The peel adhesion of the adhesive carrier from the substrate was evaluated quantitatively by the 90° peel adhesion test (performed according to the method described under Test Methods, above) and the peel adhesion of the image graphic from the adhesive carrier was evaluated quantitatively by the 180° peel adhesion test (performed according to the method described under Test Methods, above).

Example 26

A 50 micron thick acrylic transfer adhesive sheet, available as Product No. #966 from 3M Company was laminated to one side of an 8 mm thick, rigid signboard made of foamed polyvinyl chloride with a slightly textured surface, commercially available as Forex™ from Airex AG (Sins, Switzerland). The image graphic comprised a transparent biaxially-oriented polypropylene (BOPP) film coated with a thin layer of polyurethane-based material, available as KALLE K from Kalle AG (Frankfurt, Germany).

The image graphic, handwritten, was removable from the transfer adhesive sheet. The transfer adhesive sheet was adhered strongly to the substrate, but could be removed by bonding another tape to it such as a masking tape.

Example 27

A 25 micron thick acrylic transfer adhesive sheet, available as Tape No. #9458 from 3M Company was laminated to one side of an 8 mm thick, rigid signboard made of foamed polyvinyl chloride with a slightly textured surface, commercially available as Forex™ from Airex AG (Sins, Switzerland).

A 70$\mu$ white cavitated, coextruded biaxially-oriented polypropylene (BOPP) film, available as Lithor 70LX002 from Mobil Plastics, was coated on one side with radiation curable silicone-acrylate surface coating comprising a 70:30 (parts by weight) mixture of two silicone-acrylate materials available as RC 706 and RC 711, respectively, from Th. Goldschmidt AG (Essen, Germany). The coating was applied at a thickness of about 1 micron using a five-roll coating station and then UV cured on the film in an inert gas atmosphere using high intensity UV lamps as prescribed by the manufacturers.

The coated BOPP was then printed on the non-coated side by flexographic printing. The coated side of the image graphic was then applied to the exposed surface of the transfer sheet.

The image graphic was removable from the adhesive surface without stretching or distorting the BOPP film. The transfer adhesive sheet was permanently bonded to the substrate Comparative Example 6

Example 27 was repeated, with the exception that the surface modifier coating was not present on the image graphic. The image graphic was not cleanly removable from the transfer adhesive surface. Portions of the transfer adhesive sheet were removed from the surface and remained adhered to the image graphic.

Example 28

An advertising board comprising a painted steel sheet was chosen as a substrate. A DIN A4 sheet (21 cm×29.7 cm) of double-coated transfer adhesive sheet having a high tack acrylic PSA on one side and a low tack acrylic PSA on the other side, available as No. 9415 High Tack/Low Tack Double-Coated Tape from 3M Company, St. Paul, Minn., USA, was laminated to cover one of the two surfaces of the advertising board. The liner was removed from the low adhesion side and then the low adhesion side of the transfer adhesive sheet was applied to the painted metal surface using a rubber-coated roller.

A white, 115 micron, cast polypropylene film was coated on one side with radiation curable silicone-acrylate release material comprising a 70:30 (parts by weight) mixture of two silicone-acrylate materials available as RC 706 and RC 711, respectively, from Th. Goldschmidt AG (Essen, Germany). The release coating was applied at a thickness of about 1 micron using a five-roll coating station and then UV cured on the film in an inert gas atmosphere using high intensity UV lamps as prescribed by the manufacturers.

The silicone-coated polypropylene described above was then imaged on the non-siliconized side by screen printing.

The image carrier was then adhered to the double-coated adhesive by contacting the siliconized side of the polypropylene to the high adhesion side of the transfer adhesive sheet. The image graphic was removable and was not damaged during the removal process.

Comparative Example 7

Example 28 was repeated with the exception that the transfer adhesive sheet was applied to the substrate in the reverse manner, that is, where the high adhesion side was adhered to the substrate.

The image carrier of Example 28 was then adhered to the exposed surface of the transfer adhesive sheet.

The adhesion between the exposed adhesive layer and the image graphic was insufficient to hold the image graphic to the surface and it fell off without application of external peel forces.

Example 29

A double-coated adhesive sheet was prepared by laminating an acrylic transfer sheet, No. 9470 available from 3M, to both sides of a 36 micron clear polyester, available as Hostaphan RN 36 from Hoechst (Frankfurt, Germany). The transfer adhesive sheet thus prepared was then adhered to melamine-coated chipboard.

An image carrier was prepared from a paper having high wet strength, available as Scotchprint™ 8618 Electrostatic Paper from 3M Company. The paper was silicone-coated (on the side opposite that intended for the electrostatic image) with the UV curable silicone mixture of Example 27.

The image carrier was provided with an image using electrostatic printing. Then the siliconized side of the image graphic was applied to the double-coated adhesive sheet. The image graphic was removable without tearing the paper.

Example 30

A 50 micron white polyester, available as Mylar XMWH 12 from DuPont, was printed on one side using offset printing. A 50 micron thick acrylic transfer sheet, available as Transfer Tape No. 966 from 3M Company, was then laminated to the printed side of the polyester. The other side of the polyester was laminated to a second 50 micron thick acrylic transfer sheet, available as No. 9470 Transfer Tape from 3M Company, to make a double-coated adhesive sheet.

The double-coated adhesive sheet was then adhered to 8 mm thick polymethylmethacrylate (PMMA) panel, using the less adhesive side comprising transfer sheet No. 966.

The image carrier of Example 28 (cast PP with UV-cured silicone/acrylate release coating) was imaged using offset printing and adhered to the exposed adhesive of the double-coated adhesive sheet.

In these examples, a first image present on the substrate side of the adhesive carrier could be viewed through the substrate and a second image could be viewed from on the exposed surface of the image carrier.

TABLE 6

| Ex. | 90° Peel adhesion Double-coated adhesive sheet from substrate (N/2.54 cm, 24 h dwell) | 90° Peel adhesion Double-coated adhesive sheet from substrate (N/2.54 cm, 14 d dwell) | 180° Peel adhesion Image graphic from PSA (N/2.54 cm, 24 h dwell) | 180° Peel adhesion Image Graphic from PSA (N/2.54 cm, 14 d dwell) |
|---|---|---|---|---|
| 25 | 7.48 | 11.82 | 0.43 | 2.36 |
| 26 | 3.08 | 11.15 | 0.642 | 0.75 |
| 27 | 7.48 | 11.82 | 0.55 | 1.68 |
| C6 | 7.48 | 11.82 | 8.89 | 11.64 |
| 28 | 0.78 | 1.23 | 0.214 | 0.13 |
| C7 | 9.47 | 11.23 | falls off | falls off |
| 29 | 13.7 | 16.47 | 0.321 | 0.19 |
| 30 | 8.87 | 13.25 | 0.321 | 0.19 |

Example 31

A double-coated adhesive sheet was prepared by first coating a higher adhesion solvent-based acrylic pressure-sensitive adhesive, available as AROSET #1450 from Ashland Chemical (Columbus, Ohio, USA) onto a 36 micron polyethylene terephthalate (PET) film (both sides corona treated, available as Hostaphan RN 36 from Hoechst AG) and covering the dried adhesive layer with a siliconized paper liner. The opposite side of the polyethylene terephthalate film was coated in a similar manner with a layer of a second, lower adhesion solvent-based acrylic pressure-sensitive available as AROSET #1452 from Ashland Chemical (Columbus, Ohio, USA). The second adhesive layer was also protected with a siliconized paper liner.

The liner was removed from the higher adhesion side and then a 21 cm×15 27.9 cm (DIN A4) sheet thus prepared was laminated to Forex™ board (available from Airex AG, Sins, Switzerland) with the higher adhesion side of the double-coated adhesive sheet towards the substrate.

An image graphic was prepared by printing a 60$\mu$ thick, white, printable, coextruded, cavitated, biaxially-oriented

TABLE 5

| | | Easy Application/Challenging Environment | | | | | |
|---|---|---|---|---|---|---|---|
| | | SHEET | | | IMAGE GRAPHIC | | |
| Ex. | SUBSTRATE | PSA (adhered to substrate) | Carrier | PSA (adhered to image graphic) | Coating | Sheet | Image |
| 25 | PVC foam board | acrylic double-coated sheet | | | silicone | 3M film | offset printing |
| 26 | " | acrylic double-coated sheet | | | Poly-urethane | BOPP | hand-writing |
| 27 | " | acrylic double-coated sheet | | | silicone | BOPP | Flexographic printing |
| C6 | " | acrylic double-coated sheet | | | none | BOPP | Flexographic printing |
| 28 | Painted metal | acrylic | polyester | Acrylic | silicone | cast PP | screen printing |
| C7 | Painted metal | acrylic | polyester | Acrylic | silicone | cast PP | screen printing |
| 29 | melamine coated chipboard | acrylic | polyester | Acrylic | silicone | Paper (with wet strength) | electrostatic printing |
| 30 | PMMA | acrylic | polyester (printed) | Acrylic | silicone | cast PP | offset printing |

polypropylene (BOPP), available as LABELYTE 60 LH 534 from Mobil Plastics, using offset printing. The image graphic was laminated to the double-coated adhesive sheet in DIN A 4 size after removal of the liner.

The image carrier adhered securely to the adhesive surface, but was easily removable. The double-coated adhesive sheet did not lift from the substrate during removal of the image graphic.

The peel adhesion of the adhesive carrier from the substrate and the peel adhesion of the image graphic from the adhesive carrier were evaluated quantitatively by the 90° peel adhesion test (performed according to the method described under Test Methods, above).

After the image graphic was removed, the exposed adhesive surface was deliberately contaminated with particulate manner consisting of a mixture of 38.4 % by weight peat, 18.0% by weight cement, 18.0% kaolin and 18.0% diatomaceous earth, 6.25% mineral oil and 1.05% carbon black and 0.3% ferrous oxide. One gram of the above mixture was sprinkled evenly onto an adhesive sheet measuring 15 cm×15 cm. The contaminated surface was then washed with a dilute aqueous soap solution, rinsed and allowed to dry. Adhesion values of the cleaned adhesive surface had returned to 80% of the uncontaminated value.

Comparative Example 8

Example 31 was repeated with the exception that double-coated adhesive sheet was adhered to the substrate in reverse fashion, that is, where the lower adhesion side was towards the substrate.

The image graphic of Example 31 was applied to the exposed surface of the sheet. The image graphic was not removable from the sheet. On attempts to remove the image graphic, the entire assembly, including the double-coated adhesive sheet, separated from the substrate.

Comparative Example 9

Example 31 was repeated with the exception that another image graphic was employed. The image graphic was an embossed cast polypropylene film. Because of the embossing, the contact between the image carrier and the adhesive surface was insufficient to make a good adhesive bond, the image carrier separated from the adhesive surface due to its own weight without application of external peel forces when the assembly placed in a vertical position.

Example 32

A double-coated adhesive sheet was prepared by coating a 36$\mu$ clear polyethylene terepthalate (PET), available as Hostaphan RN 36 from Hoechst (both sides corona treated), with a mixture of two solvent-based acrylic pressure-sensitive adhesives. The adhesive mixture consisted of one part by weight of a lower adhesion solvent-based acrylic pressure-sensitive, available as AROSET #1452 from Ashland, and 3 parts by weight of a second higher adhesion acrylic pressure-sensitive adhesive, available as AROSET #1450 from Ashland Chemical (Michigan, USA). This mixture was coated on the one side of the sheet to form the higher adhesion side of the sheet to give a dry coating weight of 50 microns. A mixture of 3 parts AROSET 1452 (described above) and one part AROSET 1450 (described above) was coated on the other side of the sheet, also at a dry coating weight of 50 microns, to form the lower adhesion side of the double-coated adhesive sheet.

The double-coated adhesive sheet thus prepared was adhered to the substrate with the higher adhesion side facing the substrate.

The image graphic was prepared by screen printing one side of a sheet of 115 micron thick, white, extruded non-oriented polypropylene film, extruded from a mixture of 91% by weight pellets of polypropylene (available as Finapro 7060S from Fina Chemicals) and 9% by weight pellets of polyethylene containing titanium dioxide pigment (available as REMAFIN weiss from Hoechst). The image graphic was applied to the low adhesion side of the double-coated adhesive sheet. The image graphic was removable from the adhesive surface without distorting or damaging it. The double-coated adhesive sheet did not lift from the substrate during removal of the graphic. The double-coated adhesive sheet itself was also removable from the substrate.

Example 33

A 80 micron white biaxially-oriented polypropylene (BOPP) available as Trespaphan OWD 80 from Hoechst-Trespaphan (Neunkirchen, Germany) was printed on one side with an image using flexographic printing. A clear double-coated adhesive sheet was then prepared by coating a acrylate-based low viscosity syrup (90 parts by weight isooctyl acrylate, 10 parts by weight fumed silica (AEROSIL R972 from Degussa and 0.2 parts by weight photoinitiator (available as IRGACURE 651 from Ciba-Geigy) onto the printed BOPP described above. Each of the sides of the BOPP carrier was coated simultaneously via knife coating with two slightly differing syrups comprising a mixture of acrylic polymer and monomer, each at a thickness of 100 microns.

The syrup used for one side contained, in addition to the components mentioned above, 2.0% tetrapropyleneglycol diacrylate (TPGDA) crosslinking agent. The syrup used for the other side contained 0.5% TPGDA crosslinking agent. The adhesive layer having the lower amount of crosslinker had higher adhesion. The syrup containing the lesser amount of crosslinker (0.5%) was coated onto the side of the BOPP film bearing the printed image. The syrup-coated BOPP was then protected between two siliconized polyethylene terephthalate (PET) liners and the syrups then cured using UV radiation as described in European Patent Application EP 0 736 585 to make pressure-sensitive adhesive layers.

The double-coated adhesive sheet thus prepared was adhered to a glass plate with the side of the double-coated adhesive sheet bearing the adhesive with the lesser amount (0.5%) of crosslinker. The lesser amount of crosslinker resulting in a higher adhesion pressure-sensitive adhesive. The side of the BOPP bearing the printed image also faced the glass substrate.

The image carrier comprised a 70 micron sheet of white, cavitated, biaxially-oriented polypropylene (BOPP), available as Lithor 70LX002 from Mobil Plastics. The film was a coextruded multilayer construction with a cavitated BOPP core and a BOPP-based skin layer on at least one side which was specially modified to be print receptive, especially for flexographic applications.

The film was then imaged on the image-receptive side using flexographic printing and the non-imaged side applied to the exposed face of the double-coated adhesive sheet. In this example, two images were visible: the image on the adhesive carrier was visible through the glass substrate and the image on the image carrier was visible from the opposite side of the completed construction. The image on the adhesive carrier formed a permanent part of the display, whereas the image carrier was removable and replaceable by other image graphics.

Example 34

A double-coated adhesive sheet was prepared using a 50 micron, white, polyethylene terephthalate (PET) film, available as Mylar XMWH 12 from DuPont. The film was corona treated on both sides. The film was first coated with a 75:25 mixture by weight of two solvent-based acrylic pressure-sensitive adhesives: Aroset 1450 from Ashland Chemical and Aroset 1452 from Ashland Chemical. The adhesive was coated using a knife-coater and dried in a forced air oven to give a dry coating weight of 50 microns.

A layer of acrylic pressure-sensitive adhesive as described in copending, coassigned, U.S. patent application Ser. No. 09/118,590 was coated onto a silicone-coated polyester liner to give a final thickness of 25 microns. The adhesive layer was then transferred to the second side of the polyester backing described above.

The double-coated adhesive sheet thus prepared was adhered to a painted metal sheet commonly used as a surface for outdoor advertising displays. The higher adhesion side of the double-coated adhesive sheet (bearing the solvent-borne mixture of two acrylic PSAs described first) was applied to the painted metal substrate.

The image carrier was a sheet of 75 micron white polyethylene terephthalate (PET) available as Mylar XMWH 11 from DuPont. The image carrier was imaged using offset printing and then the non-imaged surface was adhered to the exposed surface of the double-coated adhesive sheet.

The image carrier was removable from the double-coated adhesive sheet with peel forces described in the table below. The image carrier was not damaged or distorted during the removal process, nor was the double-coated adhesive sheet removed from the substrate.

Example 35

A 30 micron clear biaxially-oriented polypropylene (BOPP) film, available as Propafilm LMO 30 from ICI was corona-treated on both sides. One side was coated with a higher adhesion solvent-based acrylic pressure-sensitive adhesive, available as AROSET #1450 from Ashland Chemical (Columbus, Ohio, USA). The adhesive was then dried in a forced air oven and covered with a siliconized paper liner. The opposite side of the BOPP film was coated in a similar manner with a layer of a second, lower adhesion solvent-based acrylic pressure-sensitive available as AROSET #1452 from Ashland Chemical (Columbus, Ohio, USA).

The double-coated adhesive sheet thus formed was applied to the painted metal surface with the higher adhesion side toward the substrate. The image carrier was a sheet of flexible retroreflective sheeting available as Scotchlite™ VP 5500 Reflective Sheeting from 3M. The non-retroreflective surface of the sheeting which contacted the double-coated adhesive sheet bore a layer of polyester film. The retroreflective surface of the sheeting was provided with an image by screen printing.

The image carrier was then adhered to exposed adhesive surface of the double-coated adhesive sheet. The retroreflective sheeting was removable without damaging it or distorting it and the double-coated adhesive sheet remained on the substrate.

Example 36

Example 35 was repeated, with the exception that the image carrier was a sheet of paper having high wet strength (available as Scotchprint™ 8618 from 3M) which was imaged using electrostatic methods. After imaging, the imaged surface of the image carrier was laminated to a transparent sheet bearing a clear adhesive (available as Scotchprint™ 8910 Lustre Laminate from 3M Company) to enhance the appearance and stability of the image and the image carrier.

TABLE 7

| | | Conventional Application/Challenging Environment | | | | |
|---|---|---|---|---|---|---|
| | | SHEET | | | IMAGE GRAPHIC | |
| Ex. | SUBSTRATE | PSA (adhered to substrate) | Carrier | PSA (adhered to image graphic) | Sheet | Image |
| 31 | PVC foam board | acrylic | polyester | acrylic | BOPP | Offset printing |
| C8 | PVC foam board | acrylic | polyester | acrylic | BOPP | Offset printing |
| C9 | PVC foam board | acrylic | polyester | acrylic | Cast PP | Offset printing |
| 32 | PVC foam board | acrylic | polyester | acrylic | Cast PP | Screen-printing |
| 33 | Glass | acrylic | BOPP | acrylic | BOPP | Flexographic printing |

TABLE 7-continued

| | | Conventional Application/Challenging Environment | | | | |
|---|---|---|---|---|---|---|
| | | SHEET | | | | |
| | | PSA (adhered to | | PSA (adhered to image | IMAGE GRAPHIC | |
| Ex. | SUBSTRATE | substrate) | Carrier | graphic) | Sheet | Image |
| 34 | Painted Metal | acrylic | polyester | acrylic | polyester | Offset printing |
| 35 | Painted Metal | acrylic | BOPP | acrylic | Retroreflective sheeting | Screen printing |
| 36 | Painted Metal | acrylic | BOPP | acrylic | Paper with wet strength | Electrostatic Printing |

TABLE 8

| Ex. | 90° Peel adhesion Double-coated adhesive sheet from substrate (N/2.54 cm, 24 h dwell) | 90° Peel adhesion Double-coated adhesive sheet from substrate (N/2.54 cm, 14 d dwell) | 90° Peel adhesion Image graphic from PSA (N/2.54 cm, 24 h dwell) | 90° Peel adhesion Image Graphic from PSA (N/2.54 cm, 14 d dwell) |
|---|---|---|---|---|
| 31 | 7.66 | 10.48 | 3.54 | 4.54 |
| C8 | 0.48 | 1.67 | 6.34 | 7.4 |
| C9 | 7.66 | 10.48 | falls off | falls off |
| 32 | 3.43 | 4.50 | 0.76 | 0.70 |
| 33 | 5.19 | 4.81 | 0.08 | 0.45 |
| 34 | 3.43 | 4.50 | 1.48 | 1.95 |
| 35 | 6.01 | 9.72 | 3.02 | 4.45 |
| 36 | 6.01 | 9.72 | 0.53 | 0.67 |

Example 37

An adhesive carrier was prepared using a 21 micron thick primed polyester. The polyester was coated on one side with an acrylic PSA (A-1266, internal from 3M) to give a nominal dry coating weight of 30 grams/square meter. The other side of the polyester film was coated with a methyl ethyl ketone solution of a terpolymer comprising of 35% acrylonitrile, 58% butadiene and 7% isoprene, available as Nipol DN-1201L (Zeon Chemical Co.) to give a nominal dry coating weight of 35 grams/square meter. The adhesive acrylic PSA layer was protected with a silicone paper release liner.

The laminate just described was then bonded to an aluminum 6061 (30.4 cm×6.9 cm) test panel using the acrylic adhesive side. A 2.54 cm×17.78 cm sheet of extruded 0.1 mm plasticized polyvinylchloride was bonded by hand to the exposed surface of acrylonitrile-butadiene-isoprene terpolymer using a squeegee such that 6.9 cm of the vinyl strip was bonded to the terpolymer surface and the remainder was hanging free from the panel.

The film sample was then tested via a 180° peel test at various time intervals and various conditions of aging on a tensile tester at a rate of 30 mm per minute. Each test was replicated three times and a mean value was calculated.

Example 38

Example 37 was repeated with the exception that the plasticized PVC image carrier was coated with a 50% solids acrylate modified ethylene vinyl acetate terpolymer emulsion (available as Airflex 120 from Air Products Co., Allentown, Pa.), at 0.075 mm wet coating weight and dried at 10 min at 65° C. results in a coating weight of about least 6 grains per 154 $cm^2$ (24 $in^2$).

Example 39

Example 37 was repeated with the exception that the plasticized PVC image carrier was coated with a 50% solids vinyl acetate homopolymer emulsion (available as Gelva TS-85 from Monsanto Co., St. Louis. Mo.), at the conditions of Example 38.

Example 40

Example 37 was repeated with the exception that the plasticized PVC image carrier was coated with a 50% solids ethylene vinyl acetate copolymer (available as Gelva TS-100 from Monsanto Co., St. Louis. Mo.), at the conditions of Example 38.

Table 9 shows the results.

TABLE 9

| Example | 180° Peel Adhesion, initial (N/m) | 180° Peel Adhesion, 24 h at 23° C. (N/m) | 180° Peel Adhesion, 7 d at 65° C. (N/m) |
|---|---|---|---|
| 37 | 591 | 1061 | 1583 |
| 38 | 121 | 243 | 887 |
| 39C | delaminates | Delaminates | Delaminates |
| 40 | 417 | 626 | 643 |

Example 41

The double-coated adhesive sheet of Example 37 was employed as adhesive and a polyethylene terephthalate film (PET) employed as the image carrier.

Examples 42–44

Example 41 was repeated with the exception that the image carrier was a PET film which had been vapor-coated with metal on one side. The metals employed were nickel, silver and indium-tin oxide, respectively. The vapor-coated side of the film was adhered to the exposed surface of the double-coated adhesive sheet of Example 37 bearing the layer of acrylonitrile-butadiene-isoprene terpolymer. Table 10 shows the test results.

TABLE 10

| Example | 180° Peel Adhesion, initial (N/m) | 180° Peel Adhesion, 24 h at 23° C. (N/m) | 180° Peel Adhesion, 7 d at 65° C. (N/m)) |
|---|---|---|---|
| 41 | 382 | 626 | 643 |
| 42 | 156 | 121 | 156 |
| 43 | 34.8 | 208 | 1409 |
| 44 | 0 | 34.8 | 6.9 |

Examples 45–46

The double-coated adhesive sheet of Example 37 was employed as an adhesive carrier and impact modified polypropylene (available as SRD 7-587 from Union Carbide, Danbury, Conn.) was used as the image carrier. The PP film was evaluated in both non corona-treated and corona-treated forms, respectively. When corona-treatment was present, the treated side was adhered to the exposed terpolymer surface of the double-coated adhesive sheet.

Examples 47–48

The double-coated adhesive sheet of Example 37 was employed as an adhesive carrier and a sheet of polyethylene-co-acrylic acid (available as Primacor 1430 from Dow Chemical Co., Midland, Mich., USA.), was used as the image carrier. The E-AA copolymer film was evaluated in both non corona-treated and corona-treated forms, respectively. When corona-treatment was present, the treated side was adhered to the exposed terpolymer surface of the double-coated adhesive sheet.

Examples 49–50

The double-coated adhesive sheet of Example 37 was employed as an adhesive carrier and an ionomeric film (available as Surlyn 1705 from DuPont Co., Wilmington, Del.) was used as the image carrier. The film was evaluated in both non corona-treated and corona-treated forms, respectively. When corona-treatment was present, the treated side was adhered to the exposed terpolymer surface of the double-coated adhesive sheet.

Examples 51–52

The double-coated adhesive sheet of Example 37 was employed as an adhesive carrier and a sheet of low density polyethylene (available as Exxon 108.37, from Exxon Chemical Co.), was used as the image carrier. The LDPE film was evaluated in both non corona-treated and corona-treated forms, respectively. When corona-treatment was present, the treated side was adhered to the exposed terpolymer surface of the double-coated adhesive sheet.

Examples 53–54

The double-coated adhesive sheet of Example 37 was employed as an adhesive carrier and a sheet of high density polyethylene (available as 9640 from Chevron) was used as the image carrier. The HDPE film was evaluated in both non corona-treated and corona-treated forms, respectively. When corona-treatment was present, the treated side was adhered to the exposed terpolymer surface of the double-coated adhesive sheet.

Table 11 shows the test results.

TABLE 11

| Example | 180° Peel Adhesion, initial (N/m) | 180° Peel Adhesion, 24 h at 23° C. (N/m) | 180° Peel Adhesion, 7 d at 23° C. (N/m) | 180° Peel Adhesion, 28 d at 23° C. (N/m) | 180° Peel Adhesion, 7 d at 65° C. (N/m) |
|---|---|---|---|---|---|
| 45 | 52 | 122 | 174 | 278 | 261 |
| 46 | 139 | 296 | 348 | 522 | 783 |
| 47 | 017.4 | 17.4 | 35 | 35 | 104 |
| 48 | 139 | 278 | 278 | 348 | 957 |
| 49 | 35 | 52 | 52 | 52 | 313 |
| 50 | 174 | 487 | 226 | 209 | 1409 |
| 51 | 52 | 69 | 104 | 70 | 557 |
| 52 | 104 | 121 | 226 | 244 | 1322 |
| 53 | 35 | 52 | 87 | 70 | 122 |
| 54 | 156 | 539 | 296 | 313 | 1253 |

Example 55

The double coated sheet of Example 37 was employed as adhesive carrier and was bonded to a 30.48 cm by 30.48 cm painted aluminum panel substrate. The surface consisting of acrylonitrile-butadiene-isoprene terpolymer was exposed and the acrylic PSA bonded to the substrate.

A three layer film consisting of a thicker core layer of low density polyethylene, a first thinner skin layer of ethylene vinyl acetate copolymer and a second thinner skin layer of acrylate-modified ethylene vinyl acetate copolymer was extruded simultaneously and formed the image carrier. Both surface layers were corona treated. An image was printed on the surface consisting of the acrylate-modified EVA using the Scotchprint™ hot roll image transfer process on an Orca III Laminator.

The non-imaged ethylene vinyl acetate copolymer surface of the three-layer image carrier was bonded to the exposed surface of the acrylonitrile-butadiene-isoprene terpolymer.

Example 56

Example 55 was repeated with the exception that the EVA layer of the three layer image carrier was not corona treated before bonding to the exposed acrylonitrile terpolymer face of the double-coated adhesive sheet.

Table 12 shows the test results.

TABLE 12

| Example | 180° Peel Adhesion, initial (N/m) | 180° Peel Adhesion, 24 h at 23° C. (lb/in) | 180° Peel Adhesion, 7 days at 65° C. (N/m) |
|---|---|---|---|
| 55 | 104 | 208 | 1409 |
| 56 | 139 | 121 | 226 |

Example 57

Example 55 was repeated with the exception that 1) the film used for the adhesive carrier was a clear polyethylene terephthalate film and 2) the adhesive carrier was bonded to a glass plate using the acrylic PSA. The image graphic was prepared in the same manner as in Example 55, except that after printing, a clear overlaminate film consisting of a clear low density polyethylene with a clear acrylic PSA was bonded to the graphic by means of the clear acrylic PSA. The resulting protected graphic was bonded by adhering the imaged side to the exposed layer of acrylonitrile-butadiene-isoprene terpolymer. The graphic could clearly be seen through the glass and the clear double-coated adhesive sheet.

The graphic could be removed cleanly with out damage to the graphic or to the adhesive layer, such that both components can be reused.

Example 58

A three layer film was prepared by coextrusion for use as an image carrier. The core was a linear low density polyethylene (available as Chevron 6109T from Chevron Chemical). The two outer skin layers consisted of acrylate-modified ethylene vinyl acetate copolymer (available as Bynel 3101 from DuPont) and low density polyethylene (available as Exxon 108.37 from Exxon Chemical). The total caliper of the 3-layer film was 0.2 mm, with the majority of the total thickness being made up of the core layer. The film was printed in the same manner as in Example 55.

The imaged carrier was used in conjunction with the double-coated adhesive sheet of Example 37 as described in Example 37. Despite the thick caliper of the film, the adhesive force was sufficient to prevent lifting or curling of the graphic during use.

Example 59

A first layer of pressure-sensitive adhesive was prepared by 1) preparing a viscous syrup by partially UV polymerizing 100 parts by weight isooctylacrylate, 0.04 parts photoinitiator available as Irgacure 651 from Ciba Chemical Specialties. To the syrup were added 0.2 parts hexanediol diacrylate and an additional 0.15 parts Irgacure 651 photoinitiator. The syrup was applied with a knife coater between two silicone-coated polyester liners and polymerized using medium pressure UV lamps. The adhesive layer was exposed to a total of 7.4 milliwatts/$cm^2$ (NIST units). The thickness of the adhesive layer thus prepared was 60 microns.

One of the liners was removed and the adhesive layer laminated to a transparent corona-treated (both sides) polyethylene terephthalate film (PET) having a thickness of 50 microns.

The opposite side of the polyester film was coated with a solvent borne acrylic pressure-sensitive adhesive available as AEROSET 1450-Z-40 from Ashland Chemical (Columbus, Ohio, USA). The adhesive was applied with a knife-coater and dried in a forced air oven for 30 seconds at 120° C. The final thickness of the second adhesive layer was 30 microns.

An image graphic was then prepared by first printing a four color image by offset printing on a 120 g paper.

The non-printed side of the image graphic was then adhered to the pressure-sensitive adhesive coating of an adhesive sheet comprising a biaxially-oriented polypropylene (BOPP) backing and a rubber resin-based pressure-sensitive adhesive, available as Packaging Tape Number PP-230 from 3M, St. Paul, Minn.

For the first application to the substrate, the entire image graphic was laminated to the double-coated adhesive sheet just described with the first adhesive side (described above as isooctylacrylate side) towards the image graphic and the second exposed adhesive side (described above as the solvent borne acrylic side) temporarily protected by a liner. The image graphic (comprising the printed paper and packaging sheet)/double-coated adhesive sheet/liner laminate was then cut into sections corresponding to the size of a single face of the rotating sign components. The liner was then removed and each of the sections thus prepared was adhered to one of the three faces of a series of independently rotating triangular aluminum components of a billboard system available as Triple Wave Display from World Sign International AB, Sollentuna, Sweden, in such a manner that the entire image graphic was presented in its entire form, distributed across the rotating parallel panels.

After seven days of outdoor application the image graphic was removed. The double-coated adhesive sheet remained on the aluminum surface. A second image graphic, differing only in image from the first, was then cut into sections and applied to the double-coated adhesive sheet which remained on the surface of the sign panel.

After repeated use, the double-coated adhesive sheet could also be cleanly removed from the aluminum sign panel surface.

The invention is not limited to the above embodiments.

What is claimed is:

1. A method of displaying an image using a reusable adhesive surface, comprising the steps of:

(a) providing a flexible adhesive carrier having first and second major surfaces, each surface being substantially covered by an adhesive, the first adhesive surface engineered to bond the adhesive carrier to a substrate and the second adhesive surface engineered to releasably secure an image carrier to the adhesive carrier;

(b) bonding the adhesive carrier to a substrate at the first surface;

(c) providing a first flexible image carrier having first and second major surfaces; the first surface being imageable and the second surface being adapted to contact the releasably securing adhesive surface of the adhesive carrier, wherein the image carrier is not adapted to adhere to the substrate;

(d) imaging the first image carrier on the first surface; and (e) removably adhering the first image carrier to the adhesive carrier by contacting the second surface of the first image carrier with the second surface of the adhesive carrier, and allowing said first image carrier to reside on said adhesive carrier for a predetermined period of time;

wherein the image carrier and the adhesive carrier are substantially coextensive in size; and wherein the peel adhesion between the adhesive carrier and the first image carrier is less than the peel adhesion between the adhesive carrier and the substrate after a dwell time of 24 hours.

2. A method according to claim 1 for displaying multiple images at the same location in a serial manner using a reusable adhesive surface, further comprising the steps of:

(f) providing a second flexible image carrier having first and second major surfaces, the first surface being imageable and the second surface being adapted to contact the releasably securing adhesive surface of the adhesive carrier, wherein the second image carrier is not adapted to adhere to the substrate;

(g) imaging the second image carrier on the first surface;

(h) removing the first image carrier from the adhesive carrier; and (i) removably adhering the second image carrier to the adhesive carrier by contacting the second surface of the second image carrier with the second surface of the adhesive carrier, and allowing said second image carrier to reside on said adhesive carrier for a predetermined period of time;

wherein the image carriers and the adhesive carrier are substantially coextensive in size.

3. The method of claim 2, wherein steps(c) and (f) are carried out at substantially the same time.

4. The method of claim 2, wherein steps (d) and (g) are carried out at substantially the same time.

5. The method of claim 1, wherein the adhesive carrier is removable from the substrate without tearing of the adhesive carrier.

6. The method of claim 1, wherein the image carrier may be removed and reapplied to the adhesive carrier without distortion or damage to the image.

7. The method of claim 1, wherein the adhesive on the second adhesive surface is washable.

8. The method of claim 1, wherein the substrate is a front panel of a backlit light display.

9. The method of claim 1, wherein the image carrier is imaged using a method selected from the group consisting of thermal transfer of colorant, inkjet printing, screen printing, offset printing, flexographic printing, laser printing, electrophotographic printing, electrostatic transfer printing, and combinations thereof.

10. The method of claim 1, wherein the substrate is a multiple face, multiple component, rotating billboard system.

11. The method of claim 1, wherein the adhesive carrier and the image carrier are individually transparent or translucent, such that they are suitable for use for attachment to the front panel of a backlit light display.

12. A method of displaying an image using a reusable adhesive surface, comprising the steps of:

(a) providing an adhesively mountable image graphic composite having a reusable adhesive surface, comprising:

(i) a flexible adhesive carrier having first and second major surfaces, each surface being substantially covered by an adhesive, the first adhesive surface engineered to bond the adhesive carrier to a substrate and the second adhesive surface engineered to releasably secure an image carrier to the adhesive carrier; and (ii) a flexible image carrier having first and second major surfaces, the first surface being imageable and the second surface being in releasable contact with the releasably securing adhesive surface of the adhesive carrier;

wherein the image carrier and the adhesive carrier are substantially coextensive in size;

(b) imaging the image carrier on the first surface of the image carrier; and (c) bonding the adhesive carrier to a substrate at the first surface of the adhesive carrier.

13. A method according to claim 12 for displaying multiple images at the same location in a serial manner using a reusable adhesive surface, further comprising the steps of:

(d) providing a second flexible image carrier having first and second major surfaces, the first surface being imageable and the second surface being adapted to contact the releasably securing adhesive surface of the adhesive carrier, wherein the second image carrier is not adapted to adhere to the substrate;

(e) imaging the second image carrier on the first surface;

(f) removing the first image carrier from the adhesive carrier; and (g) removably adhering the second image carrier to the adhesive carrier by contacting the second surface of the second image carrier with the second surface of the adhesive carrier, and allowing said second image carrier to reside on said adhesive carrier for a predetermined period of time;

wherein the image carriers and the adhesive carrier are substantially coextensive in size.

14. A method of displaying an image using a reusable adhesive surface, comprising the steps of:

(a) providing a transparent or translucent, flexible adhesive carrier having first and second major surfaces, each surface being substantially covered by an adhesive, the first adhesive surface engineered to bond the adhesive carrier to a substrate and the second adhesive surface engineered to releasably secure an image carrier to the adhesive carrier;

(b) bonding the adhesive carrier to a transparent or translucent substrate at the first surface;

(c) providing a flexible image carrier having first and second major surfaces, the first surface being imageable and further being adapted to contact the releasably securing adhesive surface of the adhesive carrier, wherein the image carrier is not adapted to adhere to the substrate;

(d) imaging the image carrier on the first surface such that the image does not transfer to the adhesive carrier upon removal from the adhesive carrier;

(e) removably adhering the image carrier to the adhesive carrier by contacting the first surface of the image carrier with the second surface of the adhesive carrier, and allowing said image carrier to reside on said adhesive carrier for a predetermined period of time;

wherein the image carrier and the adhesive carrier are substantially coextensive in size.

15. A method according to claim 14 for displaying multiple images at the same location in a serial manner using a reusable adhesive surface, further comprising the steps of:

(f) providing a second flexible image carrier having first and second major surfaces, the first surface being imageable and further being adapted to contact the releasably securing adhesive surface of the adhesive carrier, wherein the second image carrier is not adapted to adhere to the substrate;

(g) imaging the second image carrier on the first surface;

(h) removing the first image carrier from the adhesive carrier without transfer of the image to the adhesive carrier; and (i) removably adhering the second image carrier to the adhesive carrier by contacting the first surface of the second image carrier with the second surface of the adhesive carrier, and allowing said second image carrier to reside on said adhesive carrier for a predetermined period of time;

wherein the image carriers and the adhesive carrier are substantially coextensive in size.

16. The method of claim 14, wherein the image carrier is additionally imaged on the second surface of the image carrier.

* * * * *

UNITED STATES PATENT AND TRADEMARK OFFICE
CERTIFICATE OF CORRECTION

PATENT NO. : 6,482,288 B1
DATED : November 19, 2002
INVENTOR(S) : Kreckel, Karl W.

It is certified that error appears in the above-identified patent and that said Letters Patent is hereby corrected as shown below:

Column 8,
Line 37, delete "aliens" and insert in place thereof -- aligns --.

Column 28,
Line 32, delete "10" and insert in place thereof -- 11 --.
Line 47, delete "24h" and insert in place thereof -- 14d --. (2nd occurrence)
Line 62, insert -- Example 14 -- following "Table 2".
Line 66, insert -- high -- following "tack".

Signed and Sealed this

Sixteenth Day of September, 2003

JAMES E. ROGAN
*Director of the United States Patent and Trademark Office*